United States Patent Office 3,695,929
Patented Oct. 3, 1972

3,695,929
CONDUCTORS INSULATED WITH A POLYMERIC AMIDE-IMIDE-ESTER AND AN AROMATIC POLYIMIDE OR AROMATIC POLYAMIDE-IMIDE OVERCOAT
Frank A. Sattler, Monroeville, Pa., assignor to Westinghouse Electric Corporation, Pittsburgh, Pa.
Original application May 21, 1968, Ser. No. 730,833, now Patent No. 3,555,113. Divided and this application Aug. 5, 1970, Ser. No. 61,116
Int. Cl. B32b 15/08; H01b 3/30
U.S. Cl. 117—218    20 Claims

ABSTRACT OF THE DISCLOSURE

Polymeric amide-imide-ester wire enameling compositions are prepared from (1) a monoanhydride of an aromatic tricarboxylic acid, e.g. trimellitic anhydride, (2) an aromatic primary diamine compound and (3) either polyfunctional acids and polyhydroxy compounds or the polyesters thereof. At least a portion of the polyol or polyhydroxy compound is a tris (hydroxyalkyl) isocyanurate, e.g. tris (hydroxyethyl) isocyanurate. The polyfunctional acids (3) comprise an acid component selected from the group consisting of trimellitic anhydride, isophthalic acid and esters of isophthalic and terephthalic acid. The polymeric amide-imide-ester may be blended with terephthalate or isophthalate polyesters, polyisocyanates and other materials. One particularly suitable polyisocyanate is prepared from dimethylterephthalate, tris (2-hydroxyethyl) isocyanurate and tolylene diisocyanate. Small amounts of aliphatic amino compounds, aliphatic polyols and other flexibilizing materials may be incorporated into either the polymeric amide-imide-ester or the polyester blended therewith. A variety of block and modified block polymers may be made. Imidization occurs during the preparation of the polymeric amide-imide-ester so that the condensed water is removed before the fluid compositions are applied and cured.

CROSS REFERENCE TO RELATED APPLICATION

This application is a division of application Ser. No. 730,833 filed May 21, 1968, now U.S. Pat. No. 3,555,113.

BACKGROUND OF THE INVENTION

This invention relates to soluble amide-imide-ester polymeric compositions and resinous blends containing such compositions, to methods of preparing such compositions and to the solid resinous coatings that such compositions provide, particularly on metal electrical conductors such as copper wire.

Terephthalate and isophthalate polyester compositions have been widely accepted in insulating electrical conductors such as copper and aluminum wire and foil. The heat shock and solvent shock properties of these polyesters, including those employing tris (2-hydroxyethyl) isocyanurate as a polyol component, have been considered one of their main weaknesses. Some manufacturers employ linear polyester overcoats in efforts to upgrade the heat and solvent shock. While some of these polyester compositions have acceptable thermal properties for most uses, applications which require higher, more reliable thermal life are increasing.

Aromatic polyimide compositions, primarily those derived from aromatic dianhydrides and primary aromatic diamines are employed as coatings where continuous reliable operation at temperatures in the 200–220° C. range is required. These compositions are derived from aromatic polyamic acid precursors that are prepared in and are soluble in expensive solvent systems. The imidization occurs after these precursors have been applied to the conductor and the condensation (splitting out a mole of water per mole of imide groups formed) has a tendency to produce blistered coatings.

Polyester-imide compositions have been made in an effort to strike a balance between the properties of the foregoing polyesters and polyimides. In general, the compositions that have substantial imide content must employ expensive solvents and are characterized by a substantial number of disadvantages of the polyimides. The compositions that are soluble in inexpensive solvent systems have a low imide content and are thus very close to the polyester compositions in properties.

SUMMARY OF THE INVENTION

None of the foregoing general compositions, indeed none known in the prior art, approaches what might be fairly classed as a universal coating for magnet wire, i.e. a coating which combines the required chemical, physical and thermal properties for most major uses with low cost. A coating must have good flexibility, adhesion to the conductor, scrape hardness, abrasion resistance, high temperature heat shock resistance, resistance to hot solvents, resistance to refrigerants, high dielectric strength and good thermal and oxidative stability. In the liquid state, the composition must also coat the conductors smoothly and rapidly and be converted to a solidified coating at a wide range of speeds in conventional wire enameling towers. An essential key to universality is, of course, cost.

Accordingly, it is an object of this invention to provide a coating composition for electrical conductors that will possess the required mechanical, physical and chemical properties, as an insulating coating on the conductors, for most major uses and which may be made at a relatively low cost.

It is another object of this invention to provide a wire enameling composition that will provide blister-free coatings having an improved heat and solvent shock, resistance to refrigerants and resistance to the abrasion of automatic winding machines and that may be employed with low cost solvent systems.

Another object of the invention is to provide a method for making an aromatic amide-imide-ester polymer having a high molecular weight and a substantial imide content in a low cost solvent system.

Yet another object is to provide a novel isocyanate which may be blended with the novel polymeric amide-imide-esters of this invention and/or with similar compositions.

Other objects of the invention will, in part, be obvious and will, in part, appear hereinafter.

BRIEF DESCRIPTION OF THE DRAWING

For a more complete understanding of the present invention, reference is made to the following description taken in conjunction with the accompanying drawing wherein.

DESCRIPTION OF THE PREFERRED EMBODIMENTS

Figure 1:
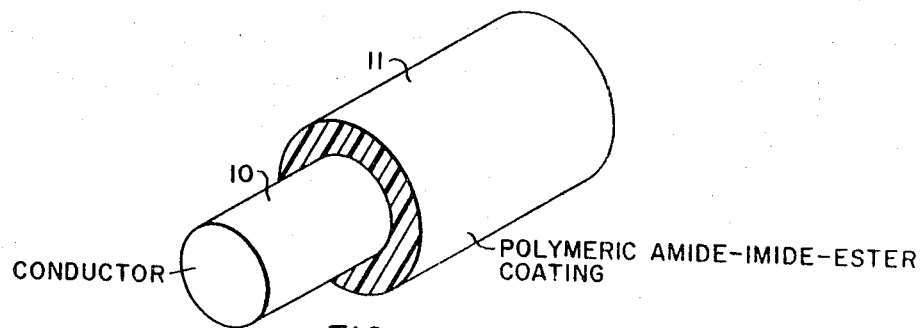
FIG. 1 is a fragmentary isometric view of conductor provided with an insulating enamel coating of this invention.

It has now been discovered that certain aromatic amide-imide-ester polymeric compositions, particularly suitable for coating electrical conductors, may be prepared from reactants comprising (1) a monoanhydride of an aromatic tricarboxylic acid, (2) an aromatic primary diamino compound and (3) a polycarboxylic acid component and a polyhydroxy component or the polymeric ester therefrom, wherein at least a portion of the polyol is a tris (hydroxyalkyl) isocyanurate or cyanurate. The polymeric amide-imide-ester itself will provide desirable insulating coatings but it may be blended with other compositions, particularly certain polyesters, to provide additional advantages. These coating compositions may be most conveniently described in terms of reactants and proportions and the specific sequence of reactions.

Suitable coating compositions, in accordance with this invention, are derived from (A) 40 to 55 equivalent percent of an acidic component comprising (1) at least 13 equivalent percent of a monoanhydride of an aromatic tricarboxylic acid, (2) up to 31 equivalent percent of at least one acidic compound selected from the group consisting of isophthalic acid and the lower dialkyl esters of isophthalic and terephthalic acids, (3) up to 10 equivalent percent of at least one acidic compound selected from the group consisting of aliphatic dicarboxylic acids containing from 4 to 10 carbon atoms and esters and anhydrides thereof, (4) up to 10 equivalent percent of a tetra alkyl titanate wherein the alkyl groups contain 1 to 4 carbon atoms and (5) up to 10 equivalent percent of a polyisocyanate, particularly the novel polyisocyanate compounds (Ester-Urethane-Isocyanate) described hereinbelow and the blocked trimer of tolylene diisocyanate and (B) 45 to 60 equivalent percent of an amino-polyol component comprising (1) at least 8 equivalent percent of an aromatic primary diamino compound, (2) up to 5 equivalent percent of an amino compound selected from the group consisting of aliphatic primary diamines, melamine, and piperazine, (3) at least 15 equivalent percent of a polyol having at least three hydroxyl groups, preferably a tris (hydroxylalkyl) isocyanurate and (4) up to 25 equivalent percent of an aliphatic diol.

The term "equivalent percent" as employed herein is calculated according to the following formula:

$$\text{Equivalent Percentage of Ingredient} = \frac{\text{Number of Moles of Ingredient} \times \text{Functionality of Ingredient}}{\Sigma (\text{Number of Moles of Ingredient} \times \text{Functionality of Ingredient})}$$

All ingredients which have reactive groups are considered in the sum ($\Sigma$) which serves as the divisor in the formula, whether already reacted in the soluble coating composition or available for reaction when cured on the electrical conductor. The functional groups are the anhydride, carboxyl, hydroxyl, amino, titanate, ester and isocyanate groups. The dicarboxylic acidic compounds, dihydric alcohols and diamines are bifunctional. The functionality of other polyols, for example tris (2-hydroxyethyl) isocyanurate, will have a functionality equal to the number of hydroxyl groups present. Trimellitic anhydride should be considered to be trifunctional in the polyester reaction (with the polyols) but bifunctional in the amide-imide reaction (with the amine).

The anhydride group is monofunctional in imide formation. In the calculations, the functionality of the trimellitic anhydride in the reaction with the diamine should be calculated on the basis that all of the possible imidization occurs first (with the anhydride group) and that the remaining carboxyl groups of the trimellitic anhydride are reactive with amino groups to form amide linkages and then hydroxyl groups to form ester linkages. It is essential, in accordance with this invention, for the molar ratio of the trimellitic anhydride to aromatic primary diamine to be in the range from about 0.8:1 to 1.8:1 in the amide-imide reaction of the polymer formation. Above the 1.8:1 ratio, the solubility of the polymer in the low cost solvent systems (e.g. cresylic acid) becomes marginal. With a 2:1 ratio, there would be essentially no amide linkages in the polymer to contribute to solubility in the low cost solvent system. The amount of imide in polymers containing no amide solubilizing groups would be limited. Compared to ester linkages, the amide linkages provide a higher degree of heat shock. In the ranges below about 0.8:1 there would be fewer imide linkages in the polymer, contributing to a lower solvent resistance and thermal resistance.

The tetraisopropyl titanate, employed as a reactive catalyst in many of the examples, is considered to be tetrafunctional. Where other non-reactive catalysts are employed, they are not considered in the calculations of equivalents. In the calculation of equivalents, the blocked trimer of tolylene diisocyanate (Mondur SH) is considered to be trifunctional with a molecular weight of 1050. The novel ester-urethane-isocyanate (hereinafter described) adds to the total functionality of the dimethyl terephthalate, THEIC and tolylenediisocyanate since all these reactive or reacted groups are contained in the prepolymer which is blended in with this novel isocyanate.

Essential to the ester formation in these compositions is at least 15 equivalent percent of a polyol having three or more hydroxyl groups, such as tris (hydroxyalkyl) isocyanurate. The most suitable and preferred example is tris (2-hydroxyethyl isocyanurate). The tris (2-hydroxyethyl) isocyanurate, hereinafter called THEIC for convenience, is readily commercially available. It should also be understood that the tautomeric analogs of the isocyanurate compounds, e.g. tris (2-hydroxyethyl) cyanurate, may be employed. These latter cyanurate triesters may be in the enol (cyanurate) form at room temperature but change to the keto (isocyanurate) form at esterifying temperatures. Other polyols having three or more hydroxyl groups, such as glycerol, trimethylolethane, trimethylolpropane, pentaerythritol and mixtures thereof may be substituted for the preferred THEIC in whole but preferably only in part. It should be understood that a significant variation in thermal properties may occur as the amount of THEIC is reduced and, as will be apparent from the examples hereinbelow, that it is preferred to use THEIC alone as the polyol having 3 or more hydroxyl groups.

Part of the foregoing trihydric polyol may be advantageously replaced by an aliphatic diol or glycol such as ethylene glycol, 1,4-butanediol, 1,5-pentanediol, hexamethylene glycol, 1,4-cyclohexanedimethanol, neopentyl glycol and mixtures thereof. As little as one equivalent percent is considered to be an effective amount for providing some improvement in flexibility. Up to 25 equivalent percent may be employed with no undue sacrifice in thermal properties.

Also essential to the formation of the compositions of this invention is at least one compound selected from the group consisting of isophthalic acid and the lower dialkyl esters of isophthalic and terephthalic acids and a monoanhydride of an aromatic tricarboxylic acid. As will become apparent from the examples, the overall stoichiometry of the reactants is the same whether the coating compositions are homopolymers, copolymers or block copolymers or blends thereof. Suitable coating compositions of any of the various types may be made so long as the stoichiometry of all reactants in the amide-imide-ester formation is maintained. Thus, from 40 to 55 equivalent percent of acid and from 45 to 60 equivalent percent of polyol are employed in the ester formation where only the ester forming ingredients are prereacted to form a high molecular weight polyester which is then reacted with the TMA and diamine. All of the ingredients are considered for calculating equivalent percentages irrespective of when they are added. Unreacted functional groups of the polyester will later react with the functional groups of the amide-imide forming ingredients.

The excess carboxyl groups of the polyester would react with amino groups to form an amide linkage whereas an excess of hydroxyl groups in the polyester would react with the carboxyl groups of the anhydride to form additional ester linkages. A polyester with excess hydroxyl groups is preferred. This reaction between the excess groups of the polyester (or ingredients therefor) and the polyamide-imide components or ingredients improves the solubility of the imide containing polymer and form copolymers (block, modified block, etc.) either before or after the coating compositions are applied to the conductor or both before and after the application.

At least 10 equivalent percent of the monoanhydride of an aromatic tricarboxylic acid, for example trimellitic anhydride, is essential in the amide-imide part of the polymer formaton for a satisfactory minimum amide-imide formation. Small amounts of tetracarboxylic aromatic dianhydride may be included to form imide groups but the amounts must be limited to prevent formation of insoluble imide from these tetracarboxylic derivatives. Solubility in the hereinafter described solvent systems is mandatory if the advantages of low cost are to be maintained. About 5 equivalent percent of the tetracarboxylic aromatic dianhydride is a maximum limit. Examples of such dianhydrides are pyromellitic dianhydride, benzophenone tetracarboxylic dianhydride, etc.

At least 8 equivalent percent of an aromatic primary diamino compound must be included. The aromatic diamino compounds may contain one or more aromatic rings. Where two rings are present, the rings may be bridged by various divalent radicals such as oxy, carboxy, sulfo, sulfonyl, amido or alkylene radicals. The rings may, of course, be joined together with no bridging groups or they may be fused rings. The essential requirement is the presence of at least two reactive primary amino groups. Methylene dianiline and m-phenylene diamine are preferred but other amines such as 4,4'-diaminodiphenyl ether, 3,4'-diaminobenzanilide and many others may be employed. Melamine, piperazine and aliphatic amines may be employed in small amounts ranging from 0.5 to 5 equivalent percent.

From 0.5 to 10 equivalent percent of an aliphatic dicarboxylic acid component may be included to afford improvements in flexibility or other properties. Dicarboxylic acids, and esters or anhydrides thereof, containing from 4 to 10 carbon atoms are suitable. Examples are sebacic acid, adipic acid, azelaic acid, and maleic anhydride.

Titanate estes, e.g. tetra alkyl titanates and tetra cresyl titanate, may be included in the polyester reactant mixture to both catalyze the esterification reaction and improve the adhesion of the cured coating to the metal conductor. From 0.5 to 8 equivalent percent of the titanate ester may be included. The alkyl groups of the tetra alkyl titanate contain 1 to 4 carbons. Non-reactive esterification catalysts may, however, be employed instead. Such catalysts are known in the art. They are generally octoates, linoleates, naphthenates, etc. of metals such as zinc, cobalt, lead, etc. The titanate ester may, of course, be blended with compositions made with non-reactive catalysts.

As will become apparent from the specific examples, the best combination of properties is provided where the ester-forming ingredients are first advanced to a thread-forming stage and the amide-imide ingredients are thereupon added to form a polymer containing the imide and amide linkages. Additional polyester may be cold blended with the polymeric amide-imide-ester or additional polyester ingredients may be added for further reaction with the polymeric amide-imide-ester. Polyester amides and/or polymeric amide-imide-esters may also be a part of the blend. The cold blends of the polymeric amide-imide-ester and terephthalate polyesters form block copolymers that give the best thermal life. In addition to the thermal life properties, the block copolymers of the cold blends provide a combination of properties not attainable by mixing all of the ingredients together in a single reaction vessel, particularly the properties of heat shock, cut-through, flexibility and baking range, although these latter compositions have better properties than the prior art polyesters.

The relative proportions of the components of the cold polymeric blends may also be conveniently described in terms of total solids weight. A solution of a polymeric amide-imide-ester composition may be cold blended with 20 to 60 percent by weight on a total solids basis of a terephthalate polyester, particularly a terephthalate-THEIC-ethylene glycol polyester. A minor proportion (10 to 20 percent by weight on a total solids basis) of a blocked polyisocyanate, for example the phenol blocked trimer of tolylene diisocyanate, may be included. From 1 to 6 percent by weight of a titanate ester, based on the total solids, may be added to the blend.

Either the polymeric amide-imide-ester or the polyester or the polyester amide component of the blend may contain a flexibilizing modifier. The preferred polyester component described above includes ethylene glycol as a modifier but other diols such as neopentyl glycol, 1,4-butanediol, hexamethylene glycol, 1,5-pentanediol and 1,4-cyclohexanedimethanol are other examples. Aliphatic dicarboxylic acids such as sebacic, azelaic, etc. may also be included.

The coating compositions may also be blended with from about 1 to 10 percent, on a total solids weight basis, of a phenolic resin. A suitable phenolic resin may be derived from 50 to 65 equivalent percent of a phenol (such as phenol, m,p,-cresol, cresylic acid, or mixtures thereof, and 35 to 50 equivalent percent of an aldehyde (such as formaldehyde) catalyzed by a tertiary amine (such as triethanolamine).

The compositions of this invention are soluble in solvents such as cresol, cresylic acid and phenol. The compositions may be further diluted to a suitable coating viscosity with cresylic acid and/or with an aromatic hydrocarbon diluent having a preferred boiling range of about 135 to 300° C. The aromatic hydrocarbon diluent may constitute from 30 to 50 weight percent of the total solvent system. The compositions may be dip-coated, die-coated, etc. on wire, foil and the like using standard procedures.

For convenience of identifying the various ingredients employed in the examples and in the various summaries that will follow, abbreviations will be employed in accordance with the following Table I.

TABLE I

| Abbreviation | Ingredient |
| --- | --- |
| EG | Ethylene glycol. |
| THEIC | Tris (2-hydroxyethyl) isocyanurate. |
| MPD | m-Phenylenediamine. |
| MDA | Methylene dianiline. |
| TMA | Trimellitic anhydride. |
| DMT | Dimethylterephthalate. |
| IPT | Tetraisopropyl titanate. |
| TDI | Tolylene diisocyanate (80% 2,4 and 20% 2,6). |
| SA | Sebacic acid. |
| PDT | 1,5 pentanediol. |
| NPG | Neopentyl glycol. |
| CHDM | 1,4 cyclohexanedimethanol. |
| HMG | Hexamethylene glycol. |
| BTD | Butanediol 1,4. |
| AA | Adipic acid. |
| AZA | Azelaic acid. |
| ED | Ethylenediamine. |

As will be apparent from the following description, various tests are conducted on enameled or resin insulated wire to evaluate the suitability of a resinous coating composition as wire insulation. The properties described in the following examples and tables were determined in accordance with the following procedures:

Baking range.—This is a measure of the range of wire speed (in feet per minute through a 15 foot enameling tower at a hot spot temperature of 430° C.) that will provide a smooth coating which passes both a 1X Mandrel Test (no crazing, cracks or other flaws in the coating visible to the eye when the wire is wrapped about its own diameter) and a Quick Snap Test.

Quick snap test.—This is primarily a measure of flexibility of the enamel film but also indicates degree of adhesion. It is employed as a control test to determine if enamel film is underbaked or overbaked. A wire 12 inches in length between a stationary and a movable chuck is elongated rapidly so that the wire breaks at any distance more than one inch from either fastener. The enamel film should be free of any flaws or imperfections to pass this test.

Flexibility.—This is a measure of the ductility of an enamel film on a conductor and indicates the degree to which a wire can be elongated and remain free of cracks, faults, and other imperfections. The test simulates the stretching of a wire when passing over small radii pulleys, through guides, and on coil forms as it is being wound into finished coils. The test is conducted by mounting one end of a length of enameled wire in a stationary and the other end in a movable chuck which are 10 inches apart. Each one of a series of wires is elongated to a fixed percentage until flaws appear in the enamel film as the wire breaks. The maximum elongation, in percent, that the enamel film will remain flawless and free of flaws or imperfections after also being wrapped about a 1X mandrel is the reported figure.

Abrasion resistance.—This is a measure of the enamel film hardness, and the degree of adhesion of the film to the base metal and/or the cohesion between enamel layers. This test provides an indication of the ability of the enamel film to withstand winding abuses. The test is also used in the coating operation to determine the proper bake the enamel must be given to obtain the best possible properties. There are generally four test procedures which are used and they are described as follows:

(a) Unilateral scrape.—A constant load on a 9 mil diameter piano wire, which is at right angles to the wire, moves along the length of the wire with an increasing lever arm until the insulation is removed and the needle makes contact with the conductor. The distance the weighted head travels multiplied by the weight gives a numerical value for scrape resistance of the insulation.

(b) General Electric repeated scrape abrasion.—Abrasion of the wire film is accomplished with a cylindrical surface of a 16 mil diameter #11 needle which is moved back and forth a distance of ⅜ inch at right angle to the wire under a load of 700 grams. The number of cycles required to cause the needle to break through the enamel film is the GESA value.

(c) Westinghouse scrape.—A 12 inch length of enameled wire is pulled under a 9 mil diameter weighted steel piano wire at right angles to the piano wire for a distance of 4 inches on each of 4 sides 90° apart. The weight required to scrape off one-half the enamel of any one side to the conductor is considered the scrape value.

(d) Emerson scrape.—The wire is drawn at 60 ft./min. under and at right angle to a weighted 51 mil diameter needle which is placed on the moving wire and removed by a cam action assembly. The weight required to scrape through to the conductor 8 out of 10 times is the reported single scrape value.

Unless otherwise specifically noted, Abrasion Resistance was determined by method (b).

Heat shock.—This is a measure of the ability of the enamel film to withstand heat while in a stressed condition, a condition encountered, for example, in heated wound magnet wire coils. A length of enameled wire is wrapped around its own diameter twenty times. Each one of a series of test samples is placed in an oven at various increasing temperatures. The highest temperature which the stressed coils withstand after being heated for one hour and cooled to room temperature, without visual breaks or failures occurring in the enamel film is considered the heat shock value. Visual observation is made under a microscope at approximately 23× magnification. Temperatures are increased in 25° C. increments.

Cut-through temperature.—This is a measure of the ability of an enamel film to resist flow under heat and pressure as encountered, for example, in heated random wound motor armature coils. This is sometimes called a thermoplastic flow test.

Two enameled wires are placed horizontally and at right angles to each other in a suitable jig with a 1000 gram weight centered on the wires at the cross-over point. The temperature of the assembly raised at a constant rate of 5 degrees per minute until the two conductors came in contact with each other which is detected by means of electrical circuitry. The temperature at which this short circuiting occurs is considered the cut-through temperature value.

Thermal stability.—This is a test measuring the expected thermal class rating of varnished or unvarnished magnet wires in electrical equipment and is based on the theory of electrical insulation deterioration treated as a chemical rate phenomenon. The test procedure is that prescribed in IEEE No. 57. Data is reported as hours to failure at a given temperature.

Weight loss.—This is a measure of the loss in weight of an enamel film on aging at elevated temperatures. This weight loss is caused normally by loss in uncombined solvents, further polymerization and splitting off of by-products associated with the enamel, and thermal degradation of the polymeric structure.

The test includes weighing one-quarter gram samples of the wet enamel in a 2 inch diameter aluminum dish, and then heating the enamel to eliminate the solvents and thinners and complete the polymerization reaction. The resulting enamel film is initially heated at 200° C. for 24 hours and then aged at selected temperatures, normally 200° C., 225° C. and 250° C. Samples are reweighed periodically and the cumulative weight loss calculated on the weight of the sample after the initial 24 hour curing step.

Other tests that may have been conducted are specifically described when data therefrom is reported hereinbelow.

For a convenient consideration of the properties of the coatings in the following examples, the test data obtained is summarized herein Tables II and III.

TABLE II.—PROPERTIES OF WIRE ENAMELS ON #18 A.W.G. WIRE (0.040″), HEAVY BUILD

| Ex. No. | Baking range[1] | Flexibility[2] | Abrasion resistance[3] | Heat shock, °C.[4] | Cut through, °C.[5] | Varnish | Thermal life, hours, at temperature, °C.[6] | | | |
|---|---|---|---|---|---|---|---|---|---|---|
| | | | | | | | 275 | 250 | 225 | 200 |
| 1 | 17–22 | 20–25 | 50–100 | 175 | 386–401 | None | 88 | 372 | 904 | 9,500 |
| | | | | | | Silicone | 156 | 1,094 | 5,300 | |
| 2 | 19–28 | 30–35 | 30–40 | 125 | 375–395 | None | 77 | 350 | 610 | >5,000 |
| 3 | 17–25 | 10–20 | 45–70 | 225 | 360–367 | None | 260 | 1,116 | 1,388 | |
| | | | | | | Silicone | 372 | 1,272 | 2,770 | |
| 4 | 17–25 | 10–30 | 15–70 | 250 | 285–340 | None | 217 | 732 | 1595 | |
| 5 | 19–28 | 10–20 | 20–80 | 200–225 | 390–400 | None | 320 | 1,284 | 3,190 | |
| | | | | | | Silicone | 336 | 1,764 | 4,000 | |
| 6 | 17–25 | 10–20 | 40–100 | 225 | 390–410 | None | 232 | 1,282 | 8,000 | >19,700 |
| 7 | 17–22 | 10–15 | 80–150 | 225 | 350–360 | ....do...... | 219 | 1,644 | 4,200 | |
| 8 | 17–22 | 10–20 | 60–70 | 225–250 | 400–407 | ....do...... | 324 | 1,812 | 6,040 | |
| 9 | 17–25 | 10–20 | 55–185 | 225 | 385–400 | ....do...... | 278 | 1,020 | 2,700 | |

TABLE II.—PROPERTIES OF WIRE ENAMELS ON #18 A.W.G. WIRE (0.040″), HEAVY BUILD

| Ex. No. | Baking range[1] | Flexibility[2] | Abrasion resistance[3] | Heat shock, °C.[4] | Cut through, °C.[5] | Varnish | Thermal life, hours, at temperature, °C.[6] | | | |
|---|---|---|---|---|---|---|---|---|---|---|
| | | | | | | | 275 | 250 | 225 | 200 |
| 10 | 17-25 | 15-30 | 20-100 | 200 | 330-390 | None | 28 | 168 | 1,800 | >30,000 |
| | | | | | | Silicone | 28 | 252 | 8,180 | 33,100 |
| 11 | 17-28 | 20-35 | 20-60 | 175-200 | 380-390 | None | 64 | 252 | 3,450 | >27,400 |
| | | | | | | Silicone | 84 | 3,852 | 11,600 | >26,200 |
| 12 | 17-25 | 15-35 | 20-100 | 225 | 340-360 | None | 78 | 372 | 4,116 | >9,000 |
| | | | | | | Silicone | 36 | 1,740 | 8,060 | >33,100 |
| 13 | 15-22 | 5-20 | 40-100 | 250 | 330-340 | None | 24 | 168 | 5,050 | >30,000 |
| | | | | | | Silicone | 36 | 984 | 6,640 | >33,100 |
| 14 | 17-28 | 20-30 | 25-60 | 225 | 340-360 | None | 78 | 1,680 | 6,972 | |
| 15 | 19-32 | 20-35 | 26-50 | 225 | 320-350 | ...do... | 36 | 948 | 4,450 | |
| 16 | 17-22 | 20-25 | 80-100 | 225 | 390-395 | ...do... | 70 | 2,292 | 8,316 | |
| 17 | 19-28 | 10-15 | 40-90 | 200 | 390-410 | None | 212 | 1,620 | 7,300 | |
| | | | | | | Silicone | 276 | 2,472 | 8,652 | |
| 18 | 17-25 | 10-30 | 40-100 | 225 | 390-420 | None | 156 | 1,920 | 5,380 | |
| | | | | | | Silicone | 108 | 2,328 | 7,150 | |
| 19 | 17-32 | 10-30 | 30-80 | 225 | 300-350 | None | 256 | 1,824 | 2,000 | |
| 20 | 17-32 | 20-35 | 25-40 | 200 | 370-390 | None | 102 | 1,128 | 6,580 | >20,300 |
| | | | | | | Silicone | 74 | 1,340 | 5,960 | >17,800 |
| 21 | 17-28 | 15-35 | 20-90 | 175-200 | 370-410 | None | 80 | 624 | 8,484 | >10,000 |
| 22 | 17-25 | 10-25 | 50-90 | 200 | 380-400 | None | 121 | 516 | 10,700 | |
| | | | | | | Silicone | 228 | 2,532 | 11,600 | |
| 23 | 17-28 | 15-25 | 25-130 | 200 | 375-405 | None | 116 | 1,968 | 7,500 | >21,000 |
| | | | | | | Silicone | 177 | 2,592 | 8,316 | >21,000 |
| 24 | 17-28 | 10-20 | 40-150 | 200 | 370-410 | None | 165 | 768 | 7,220 | >22,000 |
| | | | | | | Silicone | 560 | 2,616 | 9,912 | >11,000 |
| 25 | 17-28 | 15-25 | 30-100 | 225 | 375-400 | None | 310 | 1,320 | 4,950 | >17,800 |
| | | | | | | Silicone | 392 | 2,160 | 7,400 | >20,700 |
| 26 | 19-25 | 10-20 | 40-150 | 225 | 400-420 | None | 204 | 1,982 | 4,620 | |
| | | | | | | Silicone | 512 | 1,968 | 4,664 | |
| 27 | 17-36 | 25-35 | 40-190 | 225-250 | 350-370 | None | 164 | 876 | 7,900 | >16,600 |
| | | | | | | Silicone | 65 | 1,512 | 7,230 | >15,900 |
| 28 | 17-36 | 30-35 | 15-30 | 225-250 | 345-380 | None | 44 | 636 | 1,092 | >13,800 |
| 29 | 17-36 | 30-35 | 30-100 | 225-250 | 305-330 | ...do... | 20 | 120 | 420 | >4,116 |
| 30 | 17-32 | 30-35 | 20-50 | 225-250 | 320-360 | ...do... | 44 | 636 | 4,200 | >13,800 |
| 31 | 17-32 | 15-30 | 20-60 | 225-250 | 305-370 | | | (7) | | |
| 32 | 17-32 | 25-35 | 28-76 | 225-250 | 340-355 | | | (7) | | |
| 33 | 17-36 | 15-30 | 20-90 | 225-250 | 300-360 | | | (7) | | |
| 34 | 17-36 | 25-30 | 30-80 | 225-250 | 330-365 | | | (7) | | |
| 35 | 17-36 | 20-35 | 17-40 | 225-250 | 300-350 | | | (7) | | |
| 36 | 19-32 | 20-25 | 20-30 | 225-250 | 380-400 | | | (7) | | |
| 37 | 17-32 | 10-35 | 26-94 | 250 | 370-400 | None | 110 | 1,308 | >5,500 | >5,500 |
| | | | | | | Silicone | 84 | 1,170 | >5,500 | >5,500 |
| 38 | 17-36 | 10-35 | 30-40 | 225-275 | | | | (7) | | |
| 39 | 19-36 | 10-35 | 20-45 | 225-275 | | | | (7) | | |
| 40 | 17-40 | 5-35 | 26-72 | 225-275 | 380 | | | | | |
| 41 | 19-36 | 10-35 | 26-64 | 225-275 | 385 | | | | | |
| 42 | 17-36 | 5-35 | 32-80 | 225-275 | 390 | | | (7) | | |
| 43 | 19-25 | 10-20 | 20-40 | 225 | 390-405 | None | 1,152 | 5,192 | 12,600 | |
| 44 | | | | | | Imide overcoat. | 296 | 2,680 | 17,500 | |
| 45 | 17-32 | 10-35 | 70-95 | >300 | | | 140 | 1,332 | >2,500 | |

[1] Baking range is speed range (in feet per minute through a 15-foot tower at a hot-spot temperature of 430° C.), coating smoothly, passing 1X mandrel and passing quick snap test.
[2] Flexibility is range of maximum percent elongations which pass 1X mandrel over entire baking range.
[3] Abrasion resistance is number of strokes to failure, 16 mil diameter knife edge, 700 grams load.
[4] Heat Shock—Highest temperature (25° C. increments) at which 1X mandrel shows no cracks in 1 hour test.
[5] Cut-through—Crossed wires loaded with 1,000 grams weight and temperature increased at 5° C. per minute. Cut-through temperature is temperature at which wires fail 120 v.
[6] Thermal life—IEEE No. 57 procedure, 1,000 volt criterion on twisted pairs.
[7] No data.

TABLE III.—WEIGHT LOSS DATA

[In air circulating ovens—approximate ¼ grain film in 2.0″ diameter aluminum dish]

| | Weight loss at 250° C., percent | | | Weight loss at 200° C., percent | | | |
|---|---|---|---|---|---|---|---|
| Ex. | 10 days | 40 days | 80 days | 10 days | 60 days | 120 days | 400 days |
| 1 | 16 | 30.5 | 43.5 | 3.5 | 8.9 | 14.6 | 21.6 |
| 5 | 5.8 | 16.6 | 25.5 | 0.5 | 1.5 | 3.6 | 10.4 |
| 3 | 1.8 | 8.1 | 15.4 | [1]0.3 | 0.3 | 1.2 | 4.1 |
| 4 | 1.4 | 7.0 | 13.2 | [1]0.7 | 0.2 | 0.8 | 3.5 |
| 11 | 13.0 | 29.5 | 43.0 | (2) | (2) | (2) | (2) |
| 12 | 8.5 | 20.5 | 25.5 | (2) | (2) | (2) | (2) |
| 8 | 6.6 | 15.0 | 18.8 | 0.5 | 1.3 | 2.6 | 6.1 |
| 18 | 5.0 | 17.0 | 26.0 | 0.3 | 1.4 | 2.8 | 6.3 |
| 20 | 11.0 | 22.5 | 27.5 | 0.5 | 2.2 | 5.0 | 12.8 |
| 23 | 9.0 | 24.0 | 33.0 | 0.3 | 2.0 | 2.6 | 12.9 |

[1] Samples show actual weight gain.
[2] No data.

Prior art polyesters

The following examples are illustrations of the preparation of the prior art polyester coating compositions and the properties of wires insulated with such compositions.

EXAMPLE 1

| Ingredients | Grams | Moles | Equivalents | Equivalent percent |
|---|---|---|---|---|
| EG | 149.0 | 2.4 | 4.8 | 12.0 |
| THEIC | 1,566.6 | 6.0 | 18.0 | 45.0 |
| DMT | 1,552.0 | 8.0 | 16.0 | 40.0 |
| IPT | 84.0 | 0.296 | 1.18 | 2.95 |

The foregoing ingredients are charged to a 5-liter 4-neck flask equipped with a motor-driven stirrer, nitrogen sparge tube, thermometer and steam condenser.

The ingredients are heated to 160° C. with stirring and nitrogen sparging and the temperature is increased at the rate of 15° C. per hour to a temperature of 205° C. At 205° C. the resinous mixture becomes viscous and thread-forming, and 3000 g. of cresylic acid and 1500 g. of an aromatic hydrocarbon with a boiling range of 154° C. to 177° C. (Solvesso 100) are added.

The solution is diluted to coating viscosity with 1:1 by volume cresylic acid:Solvesso 100 and coated on #18 A.W.G. (0.040″) copper wire to a build of 2.8–3.2 mils with six passes through a 15-foot vertical tower at a hot spot temperature of 400° C. The properties listed in Table II are very good except for heat shock resistance (passes 1X mandrel at 175° C.) which is inferior to the polyester-amide-imides shown in the table. The thermal life of Example 1 is also inferior to that of most of the polyester-amide-imide wire enamels listed in the table and the weight loss (Table III) is much higher.

EXAMPLE 2

| Ingredients | Grams | Moles | Equivalents | Equivalent percent |
|---|---|---|---|---|
| EG | 149.0 | 2.4 | 4.8 | 25.5 |
| THEIC | 522.2 | 2.0 | 6.0 | 31.8 |
| DMT | 776.0 | 4.0 | 8.0 | 42.4 |
| IPT | 3.0 | 0.01055 | 0.04 | 0.21 |

These ingredients are reacted in a 3-liter reaction vessel according to the procedure of Example 1 to a thread-forming stage at a final temperature of 231° C. The resinous mixture is diluted first with 1500 grams of cresylic acid and 750 grams of Solvesso 100, then to coating viscosity with 1:1 cresylic acid:Solvesso 100 and coated on #18 A.W.G. wire. The properties listed in Table II show better flexibility and baking range but lower abrasion resistance and heat shock resistance than Example 1. The compositions of Examples 1 and 2 are used as blending materials in some of the examples hereinbelow.

TMA—THEIC Block polyester

The following examples are illustrative of the preparation of polymeric amide-imide-esters of this invention and the properties of wire insulated with such compositions. The block polyester is prepared from TMA and THEIC, some times with the adition of EG. The amide-imide linkages are derived from either MDA or MPD reacted with TMA.

EXAMPLE 3

| Ingredients | Grams | Moles | Equivalents | Equivalent percent |
|---|---|---|---|---|
| Part A: | | | | |
| THEIC | 2,340.0 | 8.96 | 26.88 | 24.85 |
| TMA | 690.0 | 3.59 | 10.77 | 9.92 |
| IPT | 16.2 | 0.0571 | 0.228 | 0.23 |
| Part B: | | | | |
| MDA | 2,680.0 | 13.5 | 27.0 | 25.00 |
| TMA | 4,150.0 | 21.6 | 43.2 | 39.90 |

The Part A ingredients, together with 539 grams of m,p-cresol, are charged to a 10-gallon reaction kettle equipped with motor-driven stirrer, nitrogen sparge tube, thermometer and air condenser. The charge is heated to 200° C. at a rate of 10° C. per hour and held at 200° C. until a thread-forming stage is reached. The reacted charge is diluted with 10,100 grams of m,p-cresol.

The MDA of Part B is then added. The TMA is added slowly over a period of one hour. After the entire TMA addition, the temperature is increased to 195° C. and held until a clear and thread-forming stage is reached. The product solution is diluted with 8630 grams of cresylic acid and 6480 grams of Solvesso 100, then thinned further to a viscosity of 9 poises at 25° C. with 1:1 cresylic acid:Solvesso 100. The solution is coated on #18 A.W.G. wire at 17 ft./min. to 25 ft./min. in a 15 foot vertical enameling tower at a hot spot temperature of 400° C.

The properties summarized in Table II show a much improved heat shock over Examples 1 and 2. Weight loss data in Table III show a much lower weight loss than the polyesters.

EXAMPLE 4

| Ingredients | Grams | Moles | Equivalents | Equivalent percent |
|---|---|---|---|---|
| Part A: | | | | |
| THEIC | 174.0 | 0.667 | 2.0 | 19.65 |
| TMA | 42.7 | 0.222 | 0.666 | 6.54 |
| IPT | 1.5 | 0.0053 | 0.021 | 0.21 |
| Part B: | | | | |
| MDA | 297.7 | 1.5 | 3.0 | 29.50 |
| TMA | 432.5 | 2.25 | 4.5 | 44.10 |

The Part A ingredients, together with 50 grams of m,p-cresol are charged to a 3 liter 4-neck flask equipped with a stirrer, nitrogen sparge tube, thermometer and air condenser. The charge is heated to 160–190° C. at 10° C./hour to a thread-forming stage. The MDA of Part B, together with 705 gram of m,p-cresol is added to the reacted charge. The TMA is added slowly over a one hour period at a reaction temperature of 160° C. The temperature is increased to 205° C. at 10° C./hour and held at 205° C. until a thread-forming resinous reaction product is obtained. The product is diluted with 900 grams of m,p-cresol and 700 grams of Solvesso 100. The solution is cooled and diluted further with 1:1 by volume cresylic acid:Solvesso 100 to a viscosity of 9.0 poises. Coatings on #18 A.W.G. wire give the properties shown in Table II with outstanding heat shock resistance. The weight loss of this material (Table III) is also outstandingly low.

EXAMPLE 5

| Ingredients | Grams | Moles | Equivalents | Equivalent percent |
|---|---|---|---|---|
| Part A: | | | | |
| EG | 44.4 | 0.715 | 1.430 | 10.8 |
| THEIC | 310.0 | 1.187 | 3.561 | 26.90 |
| TMA | 205.5 | 1.07 | 3.210 | 24.20 |
| IPT | 3.0 | 0.01055 | 0.042 | 0.32 |
| Part B: | | | | |
| MDA | 212.0 | 1.07 | 2.14 | 16.15 |
| TMA | 350.0 | 1.43 | 2.86 | 21.60 |

The Part A ingredients, together with 100 grams of m,p-cresol, are charged into a 3-liter 4-neck flash equipped with a motor-driven stirrer, nitrogen sparge tube, thermometer and steam condenser.

The ingredients are heated in the range of 160–196° C. at a rate of 15° C. per hour where a thread-forming stage is reached and the solution is diluted with 650.0 grams of m,p-cresol. At this point the MDA of Part B is added. The steam condenser is replaced by an air condenser and the temperature is increased to 170–190° C. while the TMA is added slowly. The reaction is continued at 200° C. until a thread-forming resin solution is formed and 900 g. cresylic acid and 600 g. Solvesso 100 are added. The solution is adjusted to a viscosity of 9.0 poises at 25° C. with 1:1 cresylic acid:Solvesso 100 and is coated on #18 A.W.G. wire at 17 ft./min. to 25 ft./min. in a 15-foot vertical tower at a hot spot temperature of 400° C. The properties are listed in Table II.

EXAMPLE 6

| Ingredients | Grams | Moles | Equivalents | Equivalent percent |
|---|---|---|---|---|
| Part A: | | | | |
| EG | 54.9 | 0.883 | 1.766 | 13.20 |
| THEIC | 310.0 | 1.187 | 3.561 | 26.60 |
| TMA | 238.0 | 1.238 | 3.714 | 27.70 |
| IPT | 3.0 | 0.0106 | 0.042 | 0.31 |
| Part B: | | | | |
| MPD | 95.5 | 0.883 | 1.766 | 13.20 |
| TMA | 242.6 | 1.265 | 2.530 | 18.90 |

The Part A ingredients, together with 50.0 grams of m,p-cresol, are placed in the reaction flask. With nitrogen sparging and an air condenser the temperature is increased 160° C. to 190° C. at 15° C. per hour to a thread-forming stage where 784 g. m,p-cresol and the MPD of Part B are added. The temperature is increased to 175° C. and the TMA is added slowly over a period of four hours. A semisolid resin solution is formed which becomes liquid and thread-forming after an additional heating period of one hour at 190–200° C. The resin solution is diluted to 9 poises viscosity at room temperature with 1:1 by volume cresylic acid:Solvesso 100 and coated on #18 A.W.G. wire. Properties listed in Table II show fair baking range and flex-reliability and very good heat shock, abrasion and cut through resistance along with very good thermal life.

EXAMPLE 7

| Ingredients | Grams | Moles | Equivalents | Equivalent percent |
|---|---|---|---|---|
| Part A: | | | | |
| EG | 88.8 | 1.43 | 2.86 | 21.2 |
| THEIC | 186.0 | 0.714 | 2.14 | 15.89 |
| TMA | 205.5 | 1.07 | 3.21 | 23.80 |
| IPT | 21.0 | 0.074 | 0.296 | 2.20 |
| Part B: | | | | |
| MPD | 114.6 | 1.06 | 2.12 | 15.70 |
| TMA | 275.0 | 1.43 | 2.86 | 21.20 |

The foregoing ingredients are employed to prepare another composition following the procedures outlined in Example 6. The charge is higher in ethylene glycol, m-phenylenediamine, and isopropyl titanate catalyst and lower in THEIC than Example 6. The amide-imide portion in this example contains 1.35 mols trimellitic anhydride per mol m-phenylenediamine. The flexibility is reduced due to the high isopropyl titanate content but the abrasion resistance is very good. The properties are summarized in Table II.

EXAMPLE 8

| Ingredients | Grams | Moles | Equivalents | Equivalent percent |
|---|---|---|---|---|
| Part A: | | | | |
| EG | 198.0 | 3.19 | 6.38 | 10.82 |
| THEIC | 1,382.0 | 5.29 | 15.87 | 26.82 |
| TMA | 915.0 | 4.76 | 14.28 | 24.20 |
| IPT | 13.4 | 0.0472 | 0.189 | 0.32 |
| Part B: | | | | |
| MPD | 511.0 | 4.73 | 9.46 | 16.08 |
| TMA | 1,228.0 | 6.38 | 12.76 | 21.65 |

The procedure of Example 6 is employed with the foregoing ingredients. The ethylene glycol and isopropyl titanate content are reduced and the THEIC content is increased over that of Example 7. The molar ratio of TMA/MPD in the amide-imide is 1.35. Improved cut through resistance, thermal life, and heat shock results with decreased abrasion resistance. The properties are summarized in Table II.

DMT—THEIC Block polyester

The following examples are illustrations of the preparation of polymeric amide-imide-esters of this invention wherein the block polyester is prepared from DMT and THEIC, sometimes with the addition of EG. The amide-imide linkages are provided by TMA and either MDA or MPD.

EXAMPLE 9

| Ingredients | Grams | Moles | Equivalents | Equivalent percent |
|---|---|---|---|---|
| Part A: | | | | |
| EG | 18.6 | 0.3 | 0.60 | 6.67 |
| THEIC | 196.0 | 0.75 | 2.25 | 25.00 |
| DMT | 194.1 | 1.0 | 2.00 | 22.22 |
| IPT | 10.5 | 0.037 | 0.148 | 1.64 |
| Part B: | | | | |
| MDA | 198.1 | 1.0 | 2.0 | 22.22 |
| TMA | 192.1 | 1.0 | 2.0 | 22.22 |

The Part A ingredients, together with 25.0 g. m,p-cresol and 13.0 g. xylene, are charged to a 2-liter 4-neck flask equipped with a motor-driven stirrer, nitrogen sparge tube, thermometer and steam condenser.

The ingredients are heated at 160–202° C. at a rate of 15° C. per hour where a thread-forming stage is reached and the solution is diluted with 250.0 g. m,p-cresol. At this point the MDA of part B dissolved in 200.0 g. m,p-cresol is added. The steam condenser is replaced by an air condenser and the temperature is increased 160–180° C. over a period of 3 hours while the TMA, suspended in 200 g. m,p-cresol, is added slowly over the 3-hour period. The reaction is continued at 180° C. to final reaction temperature of 200° C. over a period of 3 hours after which a thread-forming resin solution is formed and 950 g. cresylic acid and 525 g. Solvesso 100 are added. The resulting solution has a viscosity of 9.0 poises at 25° C. and is coated on #18 A.W.G. wire at 17 ft./min. to 25 ft./min. in a 15-foot vertical tower at a hot spot temperature of 400° C. The properties listed in Table II show fair flexibility, good abrasion resistance, cut through temperature and thermal life. The heat shock resistance is excellent, passing a 1X mandrel at 225° C.

EXAMPLE 10

| Ingredients | Grams | Moles | Equivalents | Equivalent percent |
|---|---|---|---|---|
| Part A: | | | | |
| THEIC | 407.0 | 1.56 | 4.68 | 39.0 |
| DMT | 303.0 | 1.56 | 3.12 | 26.0 |
| IPT | 3.0 | 0.0106 | 0.042 | 0.35 |
| Part B: | | | | |
| MPD | 112.3 | 1.04 | 2.08 | 17.32 |
| TMA | 200.0 | 1.04 | 2.08 | 17.32 |

The Part A ingredients, together with 100 grams of m,p-cresol, are charged to a 2-liter 4-neck flask equipped as heretofore described. The reaction is conducted at 160–195° C. at a rate of 10° C. per hour until a thread-forming stage is reached. The MDA of Part B together with 600 grams of m,p-cresol are added. The TMA of Part B is added slowly over the period of one hour. The reaction is continued at 200° C. until a thread-forming stage is reached. The product is diluted with a mixture of cresylic acid and Solvesso 100 (1:1, by volume) and, after cooling, adjusted with the mixture to a viscosity of 9.0 poises at 25° C. A heavy build is applied to #18 A.W.G. wire in the tower heretofore described. The properties are summarized in Table II.

EXAMPLE 11

| Ingredients | Grams | Moles | Equivalents | Equivalent percent |
|---|---|---|---|---|
| Part A: | | | | |
| EG | 48.5 | 0.78 | 1.56 | 13.12 |
| THEIC | 305.0 | 1.17 | 3.51 | 24.6 |
| DMT | 353.5 | 1.82 | 3.64 | 30.70 |
| IPT | 3.0 | 0.0106 | 0.042 | 0.35 |
| Part B: | | | | |
| MPD | 84.5 | 0.78 | 1.56 | 13.12 |
| TMA | 150.0 | 0.78 | 1.56 | 13.12 |

The Part A ingredients, together with 20.0 grams of m,p-cresol and 10.0 grams of xylene, are charged to a 2-liter reaction flask equipped as described heretofore. When a thread-forming stage is reached, the Part B ingredients, together with 500 grams of cresylic acid are added, the TMA being added slowly. The final product (at a thread-forming stage) is diluted with the 1:1 cresylic acid:Solvesso 100 mixture to a viscosity of 9 poises at 25° C. and coated, in accordance with procedures heretofore described, onto #18 A.W.G. wire. The properties are summarized in Tables II and III.

EXAMPLE 12

| Ingredients | Grams | Moles | Equivalents | Equivalent percent |
|---|---|---|---|---|
| Part A: | | | | |
| EG | 29.1 | 0.468 | 0.94 | 8.25 |
| THEIC | 237.0 | 0.911 | 2.73 | 23.90 |
| DMT | 242.0 | 1.245 | 2.49 | 21.80 |
| IPT | 3.0 | 0.0106 | 0.042 | 0.36 |
| Part B: | | | | |
| MPD | 140.5 | 1.30 | 2.60 | 22.80 |
| TMA | 250.0 | 1.30 | 2.60 | 22.80 |

The Part A ingredients, together with 20.0 grams of m,p-cresol and 10 grams of xylene, are charged to a 4-neck, 3-liter reaction flask equipped with motor stirrer, steam condenser, thermometer and nitrogen sparge tube. The charge is heated through the range of 160–215° C. at a rate of 15° C. per hour and held at the maximum temperature until a thread-forming stage is reached. At this point, the MPD of Part B dissolved in 700 grams of m,p-cresol is added. The TMA is added slowly over a period of one hour. The charge is heated to 205° C. at a rate of 10° C. per hour and held at 205° C. until a thread-forming stage is reached. 300 grams of Solvesso 100 and 800 grams of m,p-cresol are added to the reacted charge and the charge is cooled. A mixture of 1:1 cresylic acid: Solvesso 100 is added to thin the solution to a viscosity of 9.0 poises at 25° C. The resulting solution is coated on #18 A.W.G. wire at 17 ft./min. to 25 ft./min. in a 15-foot vertical tower at a hot spot temperature of 400° C. The properties are listed in Table II and it is apparent therefrom that the thermal life of the insulation is very good at 225° C. and 200° C. with and without silicone varnish.

EXAMPLE 13

| Ingredients | Grams | Moles | Equivalents | Equivalent percent |
|---|---|---|---|---|
| Part A: | | | | |
| EG | 19.4 | 0.312 | 0.624 | 5.50 |
| THEIC | 203.0 | 0.778 | 2.334 | 20.60 |
| DMT | 202.0 | 1.040 | 2.080 | 18.32 |
| IPT | 3.0 | 0.0106 | 0.042 | 0.37 |
| Part B: | | | | |
| MPD | 168.2 | 1.56 | 3.12 | 27.50 |
| TMA | 300.0 | 1.56 | 3.12 | 27.50 |

The foregoing ingredients were employed in accordance with the procedures outlined in Example 12 hereinabove to produce wire enameling compositions and insulated electrical conductors. Part A was reacted to 215° C. in the presence of 20.0 grams of m,p-cresol and 10.0 grams of xylene. Part B was reacted to 205° C. with 600.0 grams of m,p-cresol added with the MPD. The properties are summarized in Table II. It is apparent that the heat shock resistance has been markedly improved by the increased amide-imide content. The thermal life is very good at 225° C. and 200° C. with and without silicone varnish. The flexibility and the baking range in this example are beginning to decrease slightly due to the high amide-imide content. Amide-imide contents appreciably higher than that employed in this example can be expected to yield very brittle coatings.

Boiling xylene tests.—Wire samples of Examples 11, 12 and 13 were elongated 15%, wrapped on a IX mandrel and placed in boiling xylene for one-half hour. They showed no cracking, whereas a wire sample of Example 1 cracked badly when wrapped unelongated on a IX mandrel and placed in boiling xylene for ten minutes. This is an important practical test for evaluating the resistance of an enamel to varnish dipping and baking after winding into equipment with automatic winding machines.

Mixed acid-THEIC block polyester

The following examples are illustrations of the preparation of polymeric amide-imide-esters of this invention wherein the block polyester is prepared from a mixture of acid components such as DMT and TMA with THEIC. The amide-imide linkages are provided by the TMA and the aromatic diamine. It will become apparent from the following examples that the mixed polyester may be prepared from an admixture of the acid components in a single reaction or that the mixed polyester is a result of an initial reaction with one acid component and a subsequent reaction with another acid component.

EXAMPLE 14

| Ingredients | Grams | Moles | Equivalents | Equivalent percent |
|---|---|---|---|---|
| Part A: | | | | |
| EG | 66.5 | 1.072 | 2.14 | 16.20 |
| THEIC | 248.0 | 0.949 | 2.85 | 21.55 |
| DMT | 155.5 | 0.802 | 1.60 | 12.10 |
| TMA | 102.7 | 0.535 | 0.61 | 12.20 |
| IPT | 3.0 | 0.0106 | 0.042 | 0.32 |
| Part B: | | | | |
| MPD | 114.6 | 1.06 | 2.12 | 16.02 |
| TMA | 275.0 | 1.43 | 2.86 | 21.60 |

The Part A ingredients, together with 50.0 grams of m,p-cresol, are charged to a 3-liter 4-neck flask equipped with a motor-driven stirrer, nitrogen sparge tube, thermometer and steam condenser. The charge is heated to the range of 160–215° C. at a rate of 15° C. per hour and held at the upper temperature until a thread-forming stage is reached. At this point the MPD of Part B together with 750 grams of m,p-cresol is added to the charge. The temperature is slowly increased over a period of three hours to about 200° C. while the TMA of Part B is slowly added. The reaction is continued until another thread-forming stage is reached. The product is diluted with 900 grams of cresylic acid and 900 grams of Solvesso 100 and adjusted to a viscosity of 9.0 poises at 25° C. This coating composition or solution is coated on #18 A.W.G. wire at 17 ft./min. to 25 ft./min. in a 15-foot vertical tower at a hot spot temperature of 400° C. The excellent range of properties provided by this composition are listed in Table II herein.

EXAMPLE 15

| Ingredients | Grams | Moles | Equivalents | Equivalent percent |
|---|---|---|---|---|
| Part A: | | | | |
| EG | 71.4 | 1.155 | 2.31 | 21.00 |
| THEIC | 25.0 | 0.096 | 0.28 | 2.54 |
| DMT | 168.0 | 0.866 | 1.73 | 15.71 |
| IPT | 4.0 | 0.0141 | 0.056 | 0.51 |
| Part B: | | | | |
| MPD | 93.6 | 0.866 | 1.73 | 15.71 |
| TMA | 187.2 | 0.974 | 1.95 | 17.70 |
| Part C: | | | | |
| THEIC | 127.1 | 0.49 | 1.47 | 13.35 |
| TMA | 93.6 | 0.49 | 1.47 | 13.35 |

The foregoing Part A ingredients together with 20.0 grams of m,p-cresol and 10.0 grams of xylene are charged to a 3-liter 4-neck flask equipped with a motor-driven stirrer, nitrogen sparge tube, thermometer and steam condenser. The ingredients are heated to a temperature of 160–240° C. at a rate of about 15° C. per hour and held at that temperature until a thread-forming stage is reached. The MPD of Part B together with 425.0 grams of m,p-cresol are added and the TMA of Part B is added slowly as the temperature is again slowly raised to about 200° C. The reaction is continued at that temperature until another thread-forming stage is reached. At that point, the Part C ingredients together with 100.0 grams of m,p-cresol are added and the temperature is again raised to about 200° C. and the reaction is continued until another thread-forming stage is reached. The reacted mass is finally diluted with 600 grams of cresylic acid and 400 grams of Solvesso 100, the viscosity being adjusted with a 1:1 cresylic acid:Solvesso 100 admixture to provide a value of 9 poises at 25° C. The composition is coated on #18 A.W.G. wire at 17 ft./min. to 25 ft./min. in a 15-foot vertical tower at a hot spot temperature of 400° C. The properties are summarized in Table II and it is apparent that the compoistion has provided an insulation with an excellent coating range, flexibility, and heat shock resistance together with fair cut-through resistance and thermal life.

EXAMPLE 16

| Ingredients | Grams | Moles | Equivalents | Equivalent percent |
|---|---|---|---|---|
| Part A: | | | | |
| EG | 24.2 | 0.39 | 0.78 | 7.10 |
| THEIC | 152.0 | 0.606 | 1.82 | 16.51 |
| DMT | 168.1 | 0.866 | 1.73 | 15.72 |
| IPT | 3.0 | 0.0106 | 0.04 | 0.37 |
| Part B: | | | | |
| MPD | 93.6 | 0.866 | 1.73 | 15.72 |
| TMA | 187.0 | 0.974 | 1.95 | 17.72 |
| Part C: | | | | |
| THEIC | 127.0 | 0.487 | 1.47 | 13.38 |
| TMA | 93.6 | 0.487 | 1.47 | 13.38 |

The ingredients of Part A together with 20.0 grams of m,p-cresol and 10.0 grams of xylene are charged to a reaction flask equipped with a motor-driven stirrer, nitrogen sparge tube, thermometer and steam condenser. The charge is heated through the range of 160 to 200° C. at a rate of 15° C. per hour and held at 200° C. until a thread-forming stage is reached. The MPD of Part B together with 775 grams of m,p-cresol are added and an air condenser is substituted for the steam condenser. After heating to 178° C., the TMA of Part B is added slowly over a period of four hours and the temperature is increased to 200° C. to second thread-forming stage. The TMA and THEIC together with 100.0 grams of m,p-cresol are added and the reaction is continued at 195° C. until another thread-forming stage is reached. The resinous product is diluted to 9.0 poises at 25° C. with a mixture of 1:1 cresylic acid:Solvesso 100, by volume, and coated on #18 A.W.G. wire at 17 ft./min. to 25 ft./min. in a 15-foot vertical tower at a hot spot temperature of 400° C. The properties listed in Table II show a fair baking range with good flexibility, excellent abrasion resistance, excellent cut-through resistance, excellent heat shock and excellent thermal stability.

Cold blends of polymeric solutions

The following examples illustrate cold blends of solutions heretofore described. The blends contain from about 20 to 60 percent by weight on a solids basis of a polyester resin derived from DMT, THEIC and EG catalyzed by IPT. The polyester of Example 1 is an example of a polyester resin that may be employed in the cold blended compositions of this invention. A minor proportion (10 to 20 percent on a solids weight basis) of a polyisocyanate, particularly the end-blocked trimer of tolylene diisocyanate, and/or a minor proportion (1 to 6 percent on a solids weight basis) of IPT may be added to the cold blends. It will be apparent that the properties of compositions made in accordance with this ascept of the invention exhibit the best thermal life properties and a combination of properties that are not attainable with compositions obtained in a single reaction. Heat shock, cut-through, flexibility and baking range are particularly outstanding properties.

EXAMPLE 17

The polyester of Example 1 and the polymeric amide-imide-ester of Example 5 are blended together in amounts to provide a 30:70 weight proportional of Example 1: Example 5 solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients present in the polymeric amide-imide-ester and the polyester (based on the total blend) are summarized in Table IV.

EXAMPLE 18

The polyester of Example 1 and the polymeric amide-imide-ester of Example 3 are blended together in amounts to provide a 30:70 weight proportion of Example 1:Example 3 solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of 400° C. to a build of 2.8 to 3.2 mils. The properties are summarized in Table II. The sum of the equivalent percentages of each of the ingredients present in the polymeric amide-imide-ester and the polyester (based on the total blend) are summarized in Table IV.

EXAMPLE 19

The polyester of Example 1 and the polymeric amide-imide-ester of Example 4 are blended together in amounts to provide a 30:70 weight proportion of Example 1:Example 4 solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients present in the polymeric amide-imide-ester and the polyester (based on the total blends) are summarized in Table IV.

EXAMPLE 20

The polyester of Example 1, the polymeric amide-imide-ester of Example 15 and a portion of IPT are blended together in amounts to provide a 30:64:6 weight proportion of Example 1:Example 15:IPT solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients present in the total blend are summarized in Table IV.

EXAMPLE 21

The polyester of Example 1 and the polymeric amide-imide-ester of Example 8 are blended togther in amounts to provide a 50:50 weight proportion of Example 1:Example 8 solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients in the polymeric amide-imide-ester and the polyester (based on the total blend) are summarized in Table IV.

EXAMPLE 22

The polyester of Example 1 and the polymeric amide-imide-ester of Example 8 are blended together in amounts to provide a 30:70 weight proportion of Example 1:Example 8 solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients in the polymeric amide-imide-ester and the polyester (based on the total blend) are summarized in Table IV.

EXAMPLE 23

The polyester of Example 1, the polymeric amide-imide-ester of Example 8 and the phenol blocked trimer of tolylene diisocyanate are blended together in amounts to provide a 40:55:5 weight proportion of Example 1:Example 8: trimer solids and diluted to a viscosity of 9.0 poises at 25° C. with a 1:1 by volume mix of cresylic acid and Solvesso 100. The blended composition is coated on # 18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients in the polymeric amide-imide-ester and the polyester (based on the total blend) are summarized in Table IV.

EXAMPLE 24

The polyester of Example 1 and the polymeric amide-imide-ester of Example 8 and the hereinabove described trimer are blended together in amounts to provide a 40:50:10 weight proportion of Example 1:Example 8:trimer solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients in the polymeric amide-imide-ester and the polyester (based on the total blend) are summarized in Table IV.

EXAMPLE 25

The polyester of Example 1, the polymeric amide-imide-ester of Example 3 and the heretofore described blocked trimer are blended together in amounts to provide a 40:50:10 weight proportion of Example 1:Example 3:trimer solids and diluted to a viscosity of 9.0 poises at 25° C. with a 1:1 by volume mix of cresylic acid and Solvesso 100. The blended composition is coated on # 18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients in the polymeric amide-imide-ester and the polyester (based on the total blend) are summarized in Table IV.

EXAMPLE 26

The polyester of Example 1, the polymeric amide-imide-ester of Example 8 and heretofore described blocked trimer are blended together in amounts to provide a 20:70:10 weight proportion of Example 1:Example 8: trimer solids and diluted to a viscosity of 9.0 poises at 25° C. with a 1:1 by volume mix of cresylic acid and Solvesso 100. The blended composition is coated on #18 A.W.G. copper wire in a 15-foot vertical tower at a hot spot temperature of about 400° C. to a build of 2.8 to 3.2 mils. The properties are summarized in Table II. The sum of the equivalent percentages of each of the ingredients in the polymeric amide-imide-ester and the polyester (based on the total blend) are summarized in Table IV.

It should be apparent from a comparison of the property summaries in Table II that the heat shock resistance of Example 5 is decreased slightly when the Example 1 polyester is blended therewith to form the blended composition of Example 17. However, a most striking and unexpected increase in thermal life at 225° C. is obtained with the Example 17 composition compared to that obtained with the compositions of either Example 1 or Example 5. The improved thermal life is again noted in the blend of Example 18 where excellent flexibility, abrasion resistance, heat shock resistance, cut-through and thermal life are obtained. Example 19, which contains 70% of the very high amide-imide ratio resin of Example 4 shows an excellent baking range with excellent properties except that cut-through is slightly lower and the coatings do not show the marked improvement in thermal life that is apparent in the compositions of Examples 17 and 18. The high IPT content of Example 20 contributes to a desirable coating "slickness" and very high adhesion of the coating to the copper wire. The composition of Example 21 is excellent in every property except heat shock, the latter still being adequate for most applications. In Example 22, the baking range and flexibility are not as good as in Example 21 but the heat shock is improved and the thermal life, both with and without silicone varnish, is outstanding.

Examples 23 through 26 illustrate the effect of the addition of minor proportions of a trifunctional blocked isocyanate having the formula:

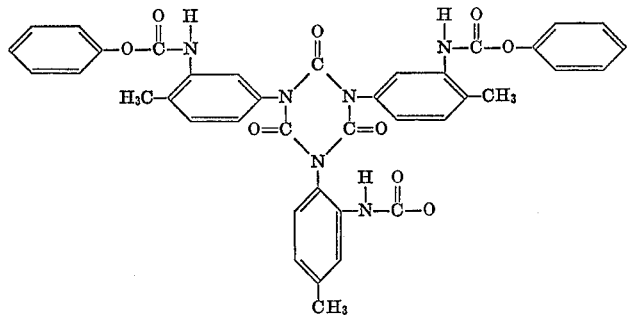

to the blends of the polymeric amide-imide-esters and polyesters. Example 23, which contains five percent of the trifunctional blocked isocyanate, has a good baking range and otherwise exhibits very good properties. The increased blocked isocyanate content of Example 24 results in a slightly decreased flexibility as compared to Example 23. Example 26, which contains only 20% of a polyester in the blend, has a lower baking range and poorer thermal life at 225° C. but has better heat shock properties. Example 25, because of the higher amide-imide content in the polymeric amide-imide-ester portion, has a better heat shock but a lower thermal life compared to Example 24.

The equivalent percentages of the ingredients employed in Examples 17 through 26 are summarized in the following table.

TABLE IV.—EQUIVALENT PERCENTAGES OF INGREDIENTS

| Ex. | EG | THEIC | MPD | MDA | TMA | DMT | IPT | Other |
|---|---|---|---|---|---|---|---|---|
| 17 | 11.19 | 32.84 |  | 10.81 | 30.60 | 13.28 | 1.19 |  |
| 18 | 4.00 | 31.59 |  | 16.65 | 33.23 | 13.38 | 1.12 |  |
| 19 | 4.87 | 31.98 |  | 15.08 | 25.94 | 19.60 | 1.56 |  |
| 20 | 17.45 | 22.95 | 10.70 |  | 21.04 | 21.54 | 5.55 |  |
| 21 | 11.40 | 35.52 | 8.37 |  | 23.92 | 19.20 | 1.59 |  |
| 22 | 11.13 | 32.03 | 11.52 |  | 32.95 | 11.31 | 1.06 |  |
| 23 | 11.26 | 34.01 | 9.59 |  | 27.35 | 16.00 | 1.37 | 0.98 |
| 24 | 11.06 | 33.92 | 9.02 |  | 25.85 | 16.60 | 1.40 | 2.05 |
| 25 | 5.66 | 33.76 |  | 12.60 | 25.12 | 18.90 | 1.50 | 2.39 |
| 26 | 10.79 | 30.05 | 12.45 |  | 35.58 | 8.12 | 0.85 | 2.06 |

Hydrolytic stability

Wire samples of Examples 1, 3, 5, 18, 22 and 23 were all wrapped on mandrels varying in size from one to four times the diameter of the 18 A.W.G. wire and sealed in separate glass tubes with several drops of water. The tubes were placed in a 150° C. oven and observed periodically. The samples of Example 1 cracked badly after 20 hours on all mandrel sizes. All the other samples were still free of cracks on all of the mandrels after one week at 150° C. This test illustrates the superior resistance of the compositions of this invention to moisture.

Blends containing a polyester and a novel ester-urethane-isocyanate

EXAMPLE 27

| Ingredients | Grams | Moles | Equivalents | Equivalent percent | Overall blend equiv. percent |
|---|---|---|---|---|---|
| Polymeric amide-imide-ester: | | | | | |
| PART A: | | | | | |
| EG | 155.4 | 2.51 | 5.02 | 15.91 | 6.88 |
| TMA | 205.5 | 1.07 | 3.21 | 10.20 | 4.40 |
| IPT | 21.0 | 0.074 | 0.30 | 0.95 | 0.41 |
| PART B: | | | | | |
| MPD | 568.8 | 5.26 | 10.52 | 33.40 | 14.42 |
| TMA | 1,198.5 | 6.23 | 12.46 | 39.50 | 17.05 |

The Part A ingredients, together with 45.0 grams of m,p-cresol are charged to a 5-liter, 4-neck reaction flask equipped with a motor-driven stirrer, an air condenser, a thermometer and a nitrogen sparge tube. The charge is rapidly heated to 160° C. and then to 195° at a rate of 15° C. per hour to form a thread-forming resin. At this point, the MPD of Part B together with 2500 grams of m,p-cresol are added. The temperature is increased to 170° C. and the TMA of Part B is added slowly over a two hour period while the temperature is maintained between 170 to 190° C. The temperature is then increased to about 205° C. for about four hours until a thread-forming resin solution is formed. The product is diluted with 2580 grams of cresylic acid and 778 grams of Solvesso 100.

| Ingredients | Grams | Moles | Equivalents | Equivalent percent | Overall blend equiv. percent |
|---|---|---|---|---|---|
| Polyester: | | | | | |
| EG | 235.0 | 3.79 | 7.58 | 25.50 | 10.38 |
| THEIC | 825.0 | 3.16 | 9.48 | 31.80 | 12.98 |
| DMT | 1,225.0 | 6.32 | 12.64 | 42.50 | 17.31 |
| IPT | 4.7 | 0.0166 | .046 | 0.15 | 0.21 |

The foregoing ingredients, together with 78.9 grams of m,p-cresol and 39.5 grams of xylene, are reacted together in accordance with the procedure outlined in Example 2 hereinabove to form a polyester. The product is diluted with 2440 grams of cresylic acid and 1705 grams of Solvesso 100.

| Ingredients | Grams | Moles | Equivalents | Equivalent percent | Overall blend equiv. percent |
|---|---|---|---|---|---|
| Ester-urethane-isocyanate: | | | | | |
| THEIC | 364.0 | 1.395 | 4.18 | 37.40 | 5.73 |
| DMT | 135.5 | 0.698 | 1.40 | 12.51 | 1.92 |
| IPT | 2.1 | 0.0074 | 0.03 | 0.27 | 0.04 |
| TDI | 486.0 | 2.79 | 5.58 | 49.90 | 7.64 |

The THEIC, DMT and IPT are charged to a 3-liter reaction flask equipped with stirrer, nitrogen sparging and steam condenser. The charge is rapidly heated to 160° C. and then 220° C. at a rate of 15° C. per hour. At 220° C., the solution is diluted with 576 grams of cresylic acid and is cooled to 60° C. A solution of the TDI (Nacconate 80) dissolved in 603 grams of cresylic acid is added to reaction flask and the temperature is rapidly increased to 125° C. After one hour at 125° C., 418 grams of cresylic acid and 418 grams of Solvesso 100 are added to the reaction flask.

| Ingredients | Grams | Moles | Equivalents | Equivalent percent | Overall blend equiv. percent |
|---|---|---|---|---|---|
| Addition: IPT | 47.2 | 0.166 | 0.66 | 100.0 | 0.90 |

The three resinous product solutions and the additional isopropyltitanate dissolved in 94 grams fo cresylic acid are blended together. The resulting solution contains 29.5% solids and has a viscosity of 9.5 poises at 25° C. When coated on #18 A.W.G. wire, the composition exhibits an excellent baking range with excellent flexibility, abrasion resistance and heat shock resistance together with good cut-through temperature and thermal life. The properties are summarized in Table II.

Wire samples of Example 27 were elongated 15%, wrappped on a mandrel having a diameter equal to the diameter of the wire and placed in boiling xylene for one-half hour. No cracking occurred. A spool of the Example 27 wire was wound into fractional horsepower motor stators using automatic winding equipment. The wires were carefully removed from these stators and tested at 110 volts for flaws in a salt water bath. A very low number of flaws, eight flaws per 100 feet of wire, were found. Similar tests on a commercial Formvar wire enamel showed twenty flaws per 100 foot of wire.

A sample of the Example 27 wire removed from the stators was placed in boiling xylene for one-half hour and showed no flaws. A commercial cross-linked polyester coated wire, having a thermoplastic polyester overcoat, was similarly wound and removed from stators and tested in boiling xylene for one-half hour. The commercial material showed frequent spots of cracking and pealing.

Blends containing flexibilized polyester

EXAMPLE 28

The composition for this example was a blend identical to that described in Example 27 except that 20% of the DMT of the polyester was replaced by an equimolar quantity of sebacic acid. The properties are summarized in Table II. It should be noted that the flexibility and heat shock are particularly good.

EXAMPLE 29

The composition for this example was a blend identical to that described in Example 27 except that 1,5-pentanediol was substituted for the ethylene glycol of the polyester. The excellent flexibility provided by this composition is accompanied by a lower cut-through temperature and lower thermal life. The properties are summarized in Table II.

EXAMPLE 30

The composition of this example was a blend identical to that described in Example 27 except that neopentyl glycol was substituted for the ethylene glycol of the polyester. The excellent flexibility obtained with this composition is accompanied by a slightly lower cut-through resistance and a good thermal life. The properties are summarized in Table II.

EXAMPLE 31

The composition for this example was a blend identical to that described in Example 27 except that 1,4-cyclohexanedimethane was substituted for the ethylene glycol of the polyester. Some loss in flexibility and cut-through resistance is apparent. The properties are summarized in Table II.

EXAMPLE 32

The composition for this example was a blend identical to that described in Example 27 except that hexamethylene glycol was substituted for the ethylene glycol of the polyester. The substitution was little effect on the properties except for a somewhat reduced abrasion resistance. The properties are summarized in Table II.

EXAMPLE 33

The composition for this example was a blend identical to that described in Example 27 except that 1,4-butane-diol was substituted for the ethylene glycol of the polyester. The abrasion resistance and cut-through temperature was reduced with no improvement in flexibility. The properties are summarized in Table II.

EXAMPLE 34

The composition for this example was a blend identical to that described in Example 27 except that 20% of the DMT of the polyester was replaced by an equimolar quantity of adipic acid. The abrasion resistance and cut-through resistance was decreased and no improvement in flexibility was noted. The properties are summarized in Table II.

EXAMPLE 35

The composition for this example was a blend identical to that described in Example 27 except that 20% of the DMT of the polyester was replaced by an equimolar quantity of azelaic acid. The abrasion resistance and cut-through resistance was decreased and no improvement in flexibility was noted. The properties are summarized in Table II.

Blends containing phenolic resin

The following examples illustrate the benefits that are derived from including a phenolic resin as a component in the composition blends of this invention.

EXAMPLE 36

Phenolic resin

| Ingredients | Grams | Moles |
|---|---|---|
| Cresylic acid | 844.0 | 7.8 |
| Formaldehyde (37%) | 560.0 | 6.21 |
| Triethanolamine | 10.0 | |

A suitable phenolic resin is prepared by refluxing a charge of the foregoing ingredients at 98° C. with stirring, for 90 minutes. The temperature is decreased to 50° C. A vacuum (30–50 mm. Hg) is applied for about 3 hours. The temperature is increased to 100° C. during this period until a sample of the resin diluted with an equal weight of cresylic acid has a Gardner viscosity of S to U. At this point, the heat is turned off and 800 g. cresylic acid is added.

Two hundred grams of the phenolic resin solution (100 grams solids) and 6,340 grams of the total blend of Example 27 (1900 grams solids) were blended together and applied to #18 A.W.G. wire. The properties are summarized in Table II. The very good cut through resistance and adhesion should be noted.

EXAMPLE 37

| Ingredients | Grams | Moles | Equivalents | Equivalent percent |
|---|---|---|---|---|
| Polymeric amide-imide-ester: | | | | |
| PART A: | | | | |
| EG | 129.2 | 2.08 | 4.16 | 13.37 |
| TMA | 171.0 | 0.888 | 2.66 | 8.52 |
| IPT | 17.3 | 0.061 | 0.24 | 0.77 |
| PART B: | | | | |
| MPD | 474.0 | 4.38 | 8.76 | 28.10 |
| TMA (1) | 821.0 | 4.27 | 8.54 | 27.40 |
| TMA (2) | 179.0 | 0.931 | 1.86 | 5.96 |
| PART C: | | | | |
| TMA | 117.0 | 0.608 | 1.22 | 3.92 |
| THEIC | 318.0 | 1.22 | 3.66 | 11.75 |

The Part A ingredients along with 36.6 g. cresylic acid are charged to a 5-liter, 4-neck reaction flask equipped with a motor-driven stirerr, air condenser, thermometer and a nitrogen spage tube. The charge is heated in the range of 160 to 195° C. at a rate of 10° C. per hour until a Ball and Ring Softening Temperature of 60° C. is reached. At this point, the MPD and the TMA (1) of Part B together with 2,080 grams of cresylic acid is added to the charge. The reaction is continued at 170 to 195° C. until a clear solution is obtained. At this point, the TMA (2) is added and the reaction is continued at 190 to 205° C. to a Ball and Ring Softening Temperature of 60° C. At this point, the TMA of Part C together with 666.0 grams of cresylic acid are added and the reaction is continued for one-half hour at 190° C. The THEIC of Part C is added and the reaction is continued at 190 to 205° C. to a Ball and Ring Softening Temperature of 65° C. The product is diluted with 2,070.0 grams of cresylic acid and 1,155.0 grams of Solvesso 100. The product solution has a weight of about 7,850.0 grams and the solids content (determined by heating a 1.0 gram sample of the solution for one-half hour at 200° C.) is 28.1%.

Polyester

This component is identical to the polyester of Example 2 with the same quantity charge. The same ingredients in the same proportions as in Example 2 are reacted to a Ball and Ring Softening Temperature of 105° C. and the product yields 3560 grams of solution at 31.0% solids, when the final solvent addition is a total of 1390 grams of cresylic acid and 972 grams of Solvesso 100.

Ester-urethane-isocyanate

This component is identical to the ester-urethane-isocyante of Example 27. The solution contains 35.6% solids and weighs 2,965.0 grams.

Phenolic resin

| Ingredients | Grams | Moles |
|---|---|---|
| m,p-Cresol | 2,870 | 26.6 |
| Formaldehyde (40%) | 1,520 | 20.3 |
| Triethanolamine | 50 | 0.336 |
| Salicylic acid | 50 | 0.362 |

The m,p-cresol, formaldehyde and triethanolamine are refluxed at 99° C. for 80 minutes and the salicylic acid is added to the charge. The reflux condenser is removed and the pressure is reduced to two inches of mercury and the reaction is continued at 40 to 60° C. until the resin has a viscosity of 20 to 60 poises at 25° C. The resin is thinned with 3,390.0 grams of cresylic acid. The yield is 6,700.0 grams of solution at 35.5% solids.

The foregoing solutions, together with 2.5 grams of IPT and 5.0 grams of cresylic acid, were blended together in the proportions indicated below to provide a blended solution having a viscosity of 8.0 poises and a 31.0% solids content.

Blended composition

| Ingredients: | Grams of solution |
|---|---|
| Polymeric amide-imide-ester | 142.2 |
| Polyester | 106.0 |
| Ester-urethane-isocyanate | 56.2 |
| Phenolic resin | 13.0 |
| IPT | 2.5 |

When coated to a heavy build on 18 A.W.G. wire, the foregoing blended composition had excellent properties that are summarized in Table II. The coated wires of this example also had a particularly outstanding Emerson Scrape resistance.

EXAMPLE 38.—Blends containing polymeric amide-ester

Polymeric amide-ester

| Ingredients | Grams | Moles |
|---|---|---|
| EG | 134.3 | 2.16 |
| THEIC | 470.0 | 1.8 |
| MPD | 51.9 | 0.48 |
| DMT | 776.0 | 4.0 |
| IPT | 3.0 | 0.0106 |

The foregoing ingredients are charged into a 4-neck, 3-liter flask equipped with motor-stirrer, nitrogen sparge tube, steam condenser and thermometer. The temperature is rapidly increased to 160° C., then to 230° C. at a rate of 15° C. per hour to a final Ball and Ring Softening Temperature of 109° C. The product is diluted with 1500 grams of cresylic acid and 1250 grams of Solvesso 100. The solution contains 29.8% solids.

The foregoing polymeric amide-ester is employed as a component in a blended composition that is identical to that described in Example 37 except that 109.0 grams of the polymeric amide-ester solution replaces the 106.0 grams of polyester solution. Excellent results are obtained on #18 A.W.G. wire as is apparent from the summary of properties in Table II.

EXAMPLE 39

Polymeric amide-ester

| Ingredients | Grams | Moles |
|---|---|---|
| EG | 134.3 | 2.16 |
| THEIC | 470.0 | 1.8 |
| EDA | 28.8 | 0.48 |
| DMT | 776.0 | 4.0 |
| IPT | 3.0 | 0.0106 |

The foregoing ingredients are reacted to a Ball and Ring Softening Temperature of 106° C. in a method identical to that described in Example 38. The product contained 29.0% solids.

The polymeric amide-ester of this example is employed as a component in a blended composition identical to that described in Example 37 except that 113 grams of this polymeric amide-ester replaces the 106.0 grams polyester. The excellent results obtained with a heavy build on #18 A.W.G. wire is apparent from the properties summarized in Table II.

EXAMPLE 40.—Blends containing plural polymeric amide-imide-esters

Polymeric amide-imide-ester (A)

This component is identical to the polymeric amide-imide-ester described in Example 37.

Polymeric amide-imide-ester (B)

| Ingredients | Grams | Moles |
| --- | --- | --- |
| Polymeric amide-imide ester (A) solution | 483.0 | |
| EG | 134.3 | 2.16 |
| THEIC | 470.0 | 1.8 |
| DMT | 683.0 | 3.52 |
| IPT | 3.0 | 0.0106 |

The foregoing ingredients are charged into a 5-liter, 4-neck reaction flask equipped with a motor-driven stirrer, vertical steam condenser, thermometer and nitrogen sparge tube. The charge is rapidly heated to 160° C., then to 205° C. at a rate of 15° C. per hour. At 205° C., a Ball and Ring Softening Temperature of 84° C. is reached and 1300.0 grams of resin grade cresylic acid and 990.0 grams of Solvesso 100 are added. The product solution weighs 3,714.0 grams and contains 32.0% solids.

Ester-urethane isocyanate

This component is identical to the ester-urethane isocyanate described in Example 37.

Phenolic resin

This component was identical to the phenolic resin described in Example 37.

The foregoing components are blended together to form an enameling composition according to the following formula.

Blended composition

| Ingredients: | Grams |
| --- | --- |
| Polymeric amide-imide-ester (A) | 713.0 |
| Polymeric amide-imide-ester (B) | 703.0 |
| Ester urethane isocyanate | 335.0 |
| Phenolic resin | 76.5 |
| IPT (in 30 grams cresylic acid) | 15.0 |

The polymeric amide-imide-ester (B) is mor compatible with the other components of the blend than the polyester of Example 37. The blended composition of this example exhibits a wider baking range (from 17 to 40 ft./min. versus 17 to 32 ft./min. for Example 37) and has excellent properties when coated on #18 A.W.G. wire to a heavy build. The properties are summarized in Table II.

EXAMPLE 41

Polymeric amide-imide-ester (A)

This component is identical to the polymeric amide-imide-ester described in Example 37.

Polymeric Amide-Imide-Ester (B):

| Ingredients | Grams | Moles |
| --- | --- | --- |
| Polymeric amide-imide-ester (A) | 966.0 | |
| EG | 134.3 | 2.16 |
| THEIC | 470.0 | 1.8 |
| DMT | 683.0 | 3.52 |
| IPT | 3.0 | 0.0106 |

The foregoing ingredients are charged to a vessel equipped as described in Example 40 and rapidly heated to 160° C., thereafter to 195° C. at a rate of 15° C. per hour. At 195° C. a Ball and Ring Softening Temperature of 75° C. is obtained and the product solution is diluted with 1300 grams of resin grade cresylic acid and 990 grams of Solvesso 100. The solution weighs 4200 grams and contains 30.8% solids.

Ester-urethane-isocyanate

This component is identical to the ester-urethane-isocyanate described in Example 37.

Phenolic resin

This component is identical to the phenolic resin described in Example 37.

Blended composition

| Component: | Grams |
| --- | --- |
| Polymeric amide-imide-ester (A) | 654 |
| Polymeric amide-imide-ester (B) | 820.0 |
| Ester-urethane-isocyanate | 335 |
| Phenolic resin | 76.5 |
| IPT (in 30 grams cresylic acid) | 15.0 |

The blended composition of this example gives good properties over a wide baking range when coated to a heavy build on #18 A.W.G. wire but the baking range is somewhat narrower than that obtained with the blended composition of Example 40. The properties are summarized in Table II.

EXAMPLE 42

Polymeric amide-imide-ester (A)

This component is identical to the polymeric amide-imide-ester described in Example 37.

Polymeric Amide-Imide-Ester (B):

| Ingredients | Grams | Moles |
| --- | --- | --- |
| EG | 134.3 | 2.16 |
| THEIC | 470.0 | 1.8 |
| MPD | 51.9 | 0.48 |
| TMA | 92.3 | 0.48 |
| DMT | 683.0 | 3.52 |
| IPT | 3.0 | 0.0106 |

The foregoing ingredients (the IPT being added together with 50.0 grams of resin grade cresylic acid and 25.0 grams of xylol) are charged to a flask equipped as described in the previous examples. The charge is rapidly heated to 160° C. and then to 225° C. at a rate of 15° C. per hour. A thread-forming stage is reached at the upper temperature and 1500 grams of resin grade cresylic acid and 1080 grams of Solvesso 100 are added. A solution containing 31.3% solids is obtained.

Ester-urethane-isocyanate

This component is identical to the ester-urethane-isocyanate described in Example 37.

Phenolic resin

This component is identical to the phenolic resin described in Example 37.

The foregoing components are blended together in the proportions indicated hereinbelow. The blend composition is coated on #18 A.W.G. copper wire to a heavy build. The excellent properties obtained are summarized in Table II.

Blended composition

| Component: | Grams |
| --- | --- |
| Polymeric amide-imide-ester (A) | 687.0 |
| Polymeric amide-imide-ester (B) | 713.0 |
| Ester-urethane-isocyanate | 335.0 |
| Phenolic resin | 76.5 |
| IPT (in 30 grams cresylic acid) | 15.0 |

EXAMPLE 43.—Aromatic polyimide and aromatic polyamide-imide overcoat combinations A #18 A.W.G. copper wire was coated with 2.6 mils of the composition described in Example 26 and overcoated with 0.4 mil of an aromatic polyimide precursor solution which is the reaction product of pyromellitic dianhydride and 4,4'-diaminophenylether (available commercially from DuPont under the proprietary name ML). The marked improvement in thermal life caused by the aromatic polyimide overcoat is summarized in Table II.

EXAMPLE 44

This example is identical to Example 43 except that the 2.6 mils undercoating was derived from the composition described in Example 11. Again, the effect of the aromatic polyimide overcoat on thermal life is noted in Table II. An even better thermal life at 225° C. is obtained in this example compared to that obtained in Example 43.

EXAMPLE 45

The blended composition of Example 37 was employed to provide a four pass coating on #18 A.W.G. copper wire. A two pass overcoat of an aromatic polyamide-imide resin which was the reaction product of trimellitic anhydride chloride and methylene dianiline (commercially available from American Oil Company under the proprietary name AI-537). The properties are summarized in Table II. It is apparent that the repeated abrasion resistance, heat shock resistance, baking range, flexibility, cut-through resistance and thermal life are excellent.

Resistance to halogenated fluorocarbons

Some applications of insulated electrical conductors require special properties in addition to those heretofore described. A hermetically sealed motor-compressor is such an application because the insulating coatings of the windings are exposed to the halogenated hydrocarbons that are used as refrigerants. The insulating coatings must resist blistering when rapidly removed from the refrigerant and heated and must retain abrasion resistance when immersed in the refrigerant. An example of a typical and widely used refrigerant is monochlorodifluoromethane (Freon 22). It should be understood, of course, that the insulating coating should retain, or sacrifice little of, the heretofore described properties.

The insulating coatings of this invention have a very high resistance to halogenated hydrocarbons. Tests comparing the coatings of this invention with a widely used hermetic grade polyvinyl acetal resin indicate the superiority of the compositions of this invention. Soaking samples of coated wire in monochlorodifluoromethane for 24 hours at room temperature, cooling to —40° C., removing and rapidly heating the samples of 150° C. caused the polyvinyl acetal samples to blister. Samples coated in accordance with Example 37 hereinabove showed no blistering.

Samples of coated wire were abraded with a 16 mil diameter knife edge under a 450 gram load while immersed in monochlorodifluoromethane. The number of strokes to failure for the hermetic polyvinyl acetal was initially 850 and less than one with each of three samples that were immersed, respectively, 1, 4 and 7 days. Samples coated in accordance with Example 37 hereinabove failed initially after 875 strokes and then after 550, 190 and 200 strokes, respectively, on samples immersed for 1, 4 and 7 days.

Novel ester-urethane-isocyanate compounds

One of the components of some of the blended compositions described herinabove is an ester-urethane-isocyanate which is the reaction product of one mol of DMT, two mols of THEIC, and four mols of TDI. Details of the preparation are given in Example 27 hereinabove. It should be noted that a diester is first formed from the DMT and THEIC and that the TDI is thereafter reacted with the diester. The reaction of the TDI is conducted in an excess of cresylic acid so that the reactive isocyanate end groups of the product are blocked by forming an aromatic urethane. The blocking improves the tank stability of the product. The Nacconate 80 employed in Example 29 is an 80:20 by weight mixture of 2,4-tolylene diisocyanate and 2,6-tolylene diisocyanate.

Other polyisocyanates may be employed in place of the TDI to provide components suitable for use in insulating compositions. Dianisidine diisocyanate, 4,4'-diphenylether diisocyanate and 4,4'-diphenylmethane diisocyanate are examples of other suitable polyisocyanates.

Other lower dialkyl esters of terephthalic acid may be used in place of the DMT to form the diester with THEIC. Isophthalic acid and lower alkyl esters thereof may also be used as a substitute for DMT, in whole or in part, but with less of an improvement in heat shock resulting in subsequent blends. Other phenols or mixtures thereof may be substituted for the cresylic acid.

While the utility of the ester-urethane-isocyanate has been heretofore illustrated in blends containing the polymeric amide-imide-ester of this invention, it should be understood that this isocyanate may be blended and/or reacted with polyester, polyester-amide and other similar wire enameling compositions. Indeed, this new polyisocyanate may be used in compositions and blends where the heretofore known polyisocyanates have been employed. The advantages of improved heat shock, solvent resistance and coating range are obtained with this new polyisocyanate without the usual decrease in flexibility that is encountered with the addition of other polyisocyanates.

Referring now to FIG. 1, conductor 10 while described in the foregoing examples as a copper wire, may be of a metal such as aluminum, silver, either alone or as a plated or clad combination. After being cured in the enameling tower or other heating means, the coating 11 adheres tenaciously to the conductor 10. While the conductor 10 is illustrated as being circular in cross section, it may be of any other desirable cross-section such as square or rectangular. The conductor 10 may be a flat strip or a thin foil.

Figure 2:
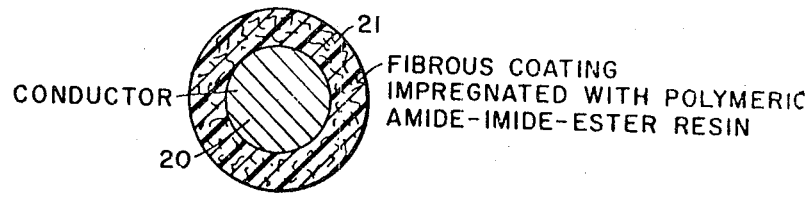
FIG. 2 is a cross-sectional view of a conductor insulated with a fibrous material and an enamel of this invention.

The compositions of this invention may also be applied to electrical conductors such as wire in combination with insulation, both organic and inorganic materials in film and/or fibrous form. One form of such a combination is illustrated in FIG. 2. A copper wire 20 is provided with a fibrous coating 21 impregnated with a solidified polymeric amide-imide-ester resinous composition heretofore described. The fibrous coating, which may be glass fibers, asbestos fibers, paper, cotton, silk or the like, may be either wrapped or braided about the conductor. The coating 21 may also be an inorganic film such as the aluminum oxide obtained by anodizing aluminum conductors in which case the resinous film would be bonded to the anodic films.

Figure 3:
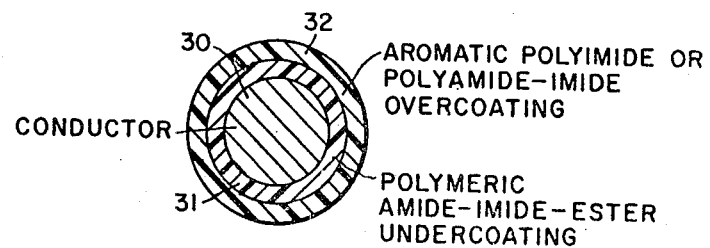
FIG. 3 is a cross-sectional view of a conductor provided with an insulated conductor of this invention having an under and an overcoat wherein one of the coatings is a composition of this invention.

The resinous coatings of this invention may be applied to conductors in combination with and either under or over coatings of other resinous compositions. FIG. 3 of the drawing is an illustration of the particularly advantageous combination of coatings described specifically in the foregoing examples. The metal conductor 30 is first coated with a polymeric amide-imide-ester film 31 and an overcoating 32 of an aromatic polyimide (such as is available commercially from E. I. du Pont as ML wire enamel) or an aromatic polyamide- imide (such as is available commercially from American Oil Company as AI–537). The advantages of these combinations are set forth in Examples 43, 44 and 45.

I claim as my invention:

1. An insulated electrical conductor comprising, in combination, a metal conductor and cured solid resinous insulation deposited on the conductor, the resinous insulation comprising (I) a coating of the heat reaction product of a soluble polymeric amide-imide-ester of (1) trimellitic anhydride, (2) an aromatic primary diamino compounds and (3) a polyol containing at least 3 hydroxy groups, wherein the molar proportions of (1):(2) for the amide-imide linkages is from 0.8:1 to 1.8:1 and (II) an overcoating, deposited over said coating (I), of a resin selected from the group consisting of aromatic polyimides and aromatic polyamide-imides.

2. The insulated electrical conductor of claim 1 wherein said coating (I) is the heat reaction product of a blend of (A) a polymeric amide-imide-ester of (1) trimellitic anhydride, (2) an aromatic primary diamino compound and (3) a polyol component at least a portion of which is a tris (hydroxyalkyl) isocyanurate, and 20–60 percent by weight of total solids of (B) the esterification product of an admixture comprising an aromatic dicarboxylic acid and a polyol component.

3. The insulated electrical conductor of claim 2 wherein the polyol component of the amide-imide-ester of (A) contains an aliphatic diol, the aromatic dicarboxylic acid of (B) is dimethylterephthalate, the polyol component of (B) contains an aliphatic diol and tris (2-hydroxyalkyl) isocyanurate.

4. The insulated electrical conductor of claim 3 wherein said blend contains, by weight a total solids, from 1 to 6 percent of a titanate ester, from about 1 to 10 percent of a phenolic resin and 10 to 20 percent of a blocked polyisocyanate.

5. The insulated electrical conductor of claim 4 wherein the aromatic polyimide is the recation product of pyromellitic dianhydride and 4,4′-diaminophenyl ether.

6. The insulated electrical conductor of claim 1 wherein the overcoating (II) is an aromatic polyamide-imide resin.

7. The insulated electrical conductor of claim 6 wherein said coating (I) is the heat reaction product of a blend of (A) a polymeric amide-imide-ester of (1) trimellitic anhydride, (2) an aromatic primary diamino compound and (3) a polyol component at least a portion of which is a tris (hydroxyalkyl) isocyanaurate, and 20–60 percent by weight of total solids of (B) the esterification product of an admixture comprising an aromatic dicarboxylic acid and a polyol component.

8. The insulated electrical conductor of claim 7 wherein the polyol component of the amide-imide ester of (A) contains of aliphatic diol, the aromatic dicarboxylic acid of (B) is dimethylterephthalate, the polyol components of (B) contains an aliphatic diol and tris (2-hydroxyalkyl) isocyanurate.

9. The insulated electrical conductor of claim 8 wherein said blend contains, by weight of total solids, from 1 to 6 percent of a titanate ester, from about 1 to 10 percent of a phenolic resin and 10 to 20 percent of a blocked polyisocyanate.

10. The insulated electrical conductor of claim 9 wherein the aromatic polyamide-imide is the reaction product of trimellitic anhydride chloride and methylene dianiline.

11. An insulated electrical conductor comprising in combination, a metal conductor and cured solid resinous insulation deposited on the conductor, the resinous insulation comprising
(I) a coating of the heat reaction product of a blend of
  (A) a polymeric amide-imide-ester of
    (1) trimellitic anhydride,
    (2) an aromatic primary diamino compound,
    (3) tris (2-hydroxyethyl) isocyanurate,
    (4) An aliphatic diol, wherein the molar proportion of (1):(2) for the amide-imide linkages is in the range of about 0.8:1 to 1.8:1,
  (B) 20 to 60 weight percent, based on total solids, of a polymeric ester of
    (1) dimethylterephthalate,
    (2) tris (2-hydroxyethyl) isocyanurate, and
    (3) an aliphatic diol,
  (C) a minor proportion of a titanate ester,
  (D) a minor proportion of an ester-urethane-isocyanate of
    (1) dimethylterephthalate,
    (2) tris (2-hydroxyethyl) isocyanurate, and
    (3) a diisocyanate compound, and
  (E) a minor proportion of a phenolic resin, and
(II) an overcoating, deposited over said coating (I), of a resin seelcted from the group consisting of aromatic polyimides and aromatic polyamide-imides.

12. The insulated electrical conductor of claim 11 wherein the aromatic polyimide resin is the reaction product of pyromellitic dianhydride and 4,4′-diaminophenyl ether.

13. The insulated electrical conductor of claim 11 wherein said overcoating (II) is an aromatic polyamide-imide.

14. The insulated electrical conductor of claim 13 wherein said aromatic polyamide-imide is the reaction product of trimellitic anhydride chloride and methylene dianiline.

15. An insulated electrical conductor comprising a metal conductor coated with
(I) a base coating of a cured solid polymeric amide-imide-ester which comprises
  (A) 40 to 55 equivalent percent of an acidic component which comprises
    (1) at least 13 equivalent percent of a monoanhydride of an aromatic tricarboxylic acid;
    (2) up to 31 equivalent percent of at least one acidic compound selected from the group consisting of isophthalic acid and the lower dialkyl esters of isophthalic acid and terephthalic acid;
    (3) up to 10 equivalent percent of at least one acidic compound selected from the group consisting of aliphatic dicarboxylic acids containing from 4 to 10 carbon atoms and esters and anhydrides thereof;
    (4) up to 8 equivalent percent of a tetra alkyl titanate wherein the alkyl groups contain 1 to 4 carbon atoms; and
    (5) up to 10 equivalent percent of a polyisocyanate; and
  (B) 45 to 60 equivalent percent of an aminopolyol component comprising
    (1) at least 10 equivalent percent of an aromatic primary diamino compound, where the molar proportions of (A)(1) to (B)(1) for the amide-imide linkages is from 0.8:1 to 1.8:1;
    (2) up to 5 equivalent percent of an amino compound selected from the group consisting of aliphatic primary diamines, melamine, and piperazine;
    (3) at least 15 equivalent percent of a polyol having at least three hydroxyl groups; and
    (4) up to 25 equivalent percent of an aliphatic diol; and
(II) a solid cured overcoating on said base coating selected from the group consisting of aromatic polyimide resins and aromatic polyamide-imide resins.

16. An insulated electrical conductor according to claim 15 wherein said base coating includes about 1 to 10 percent by weight of a phenolic resin which comprises 50 to 65 equivalent percent of a phenol and 35 to 50 equivalent percent of an aldehyde catalyzed with a tertiary amine.

17. An insulated electrical conductor according to claim 15 wherein (A)(1) is trimellitic anhydride, (A)(2) is dimethylterephthalate, (B)(1) is selected from the group consisting of methylene dianiline and m-phenylene diamine, (B)(3) is tris (2-hydroxyethyl) isocyanurate, and (B)(4) is ethylene glycol.

18. An insualted electrical conductor according to claim 15 wherein said polyisocyanate comprises 10 to 20 percent by weight of total solids of the blocked polyisocyanate reaction product of dimethylterephthalate, tris (2-hydroxyethyl) isocyanurate, and tolylene diisocyanate in the molar ratio of 1:2:4.

19. An insulated electrical conductor according to claim 18 wherein said polyisocyanate reaction product is blocked with cresylic acid.

20. An insulated electrical conductor according to claim 18 wherein said polyisocyanate reaction product is blocked with a phenol.

References Cited

UNITED STATES PATENTS

| | | | |
|---|---|---|---|
| 3,361,593 | 1/1968 | Sattler et al. | 117—218 |
| 3,428,486 | 2/1969 | George | 117—218 |
| 3,442,703 | 5/1969 | Naselow | 117—218 |
| 3,475,212 | 10/1969 | Bach | 117—218 |
| 3,493,413 | 2/1970 | Olson et al. | 117—232 |
| 3,523,820 | 8/1970 | Sheffer | 117—218 |
| 3,554,984 | 1/1971 | George | 117—232 |
| 3,425,866 | 1/1969 | Meyer et al. | 117—218 |
| 3,426,098 | 1/1969 | Meyer et al. | 117—232 |
| 3,458,480 | 7/1969 | Schmidt et al. | 117—232 |
| 3,472,815 | 10/1969 | Juveland | 117—232 |
| 3,541,038 | 11/1970 | Nakano | 117—232 |
| 3,544,504 | 12/1970 | Ulmer | 117—232 |
| 3,555,113 | 1/1971 | Sattler | 260—841 |

RALPH HUSACK, Primary Examiner

U.S. Cl. X.R.

117—128.4, 232; 174—121 SR; 260—841